US012448160B2

(12) United States Patent
Boeuf et al.

(10) Patent No.: US 12,448,160 B2
(45) Date of Patent: Oct. 21, 2025

(54) METHOD OF FILLING DEGASSED DRUG PRODUCT INTO CONTAINERS AND DRUG PRODUCT FILLING DEVICE

(71) Applicant: Hoffmann-La Roche Inc., Little Falls, NJ (US)

(72) Inventors: Julien Boeuf, Mannheim (DE); Vincent Keehnen, Mannheim (DE); Natalie Rakel, Mannheim (DE); Alexander Ulmer, Mannheim (DE); Gerald Zieres, Mannheim (DE)

(73) Assignee: Hoffman-La Roche Inc., Little Falls, NJ (US)

(*) Notice: Subject to any disclaimer, the term of this patent is extended or adjusted under 35 U.S.C. 154(b) by 820 days.

(21) Appl. No.: 17/157,594

(22) Filed: Jan. 25, 2021

(65) Prior Publication Data

US 2021/0147100 A1    May 20, 2021

Related U.S. Application Data

(63) Continuation of application No. PCT/EP2019/070198, filed on Jul. 26, 2019.

(30) Foreign Application Priority Data

Jul. 27, 2018 (EP) .................................... 18186014

(51) Int. Cl.
*B65B 3/00* (2006.01)
*B01D 19/00* (2006.01)
(Continued)

(52) U.S. Cl.
CPC ............ *B65B 3/22* (2013.01); *B01D 19/0031* (2013.01); *B01D 63/031* (2022.08); *B65B 3/003* (2013.01);
(Continued)

(58) Field of Classification Search
CPC .......... B65B 3/003; B65B 3/22; B65B 63/00; B01D 19/0031; B01D 63/02;
(Continued)

(56) References Cited

U.S. PATENT DOCUMENTS 4,636,307 A  1/1987 Inoue et al.
5,814,134 A  9/1998 Edwards et al.
(Continued)

FOREIGN PATENT DOCUMENTS

AR      012292 A1    10/2000
AR      076673 A1     6/2011
(Continued)

OTHER PUBLICATIONS

International Search Report and Written Opinion of the International Searching Authority, PCT/EP2019/070198, Aug. 20, 2019, 9 pages.
(Continued)

*Primary Examiner* — Stephen F. Gerrity
(74) *Attorney, Agent, or Firm* — Bose McKinney & Evans LLP

(57) ABSTRACT

An inventive drug product filling device for filling a liquid drug product into containers is disclosed. The drug filling device includes a drug product preparer configured for preparing the liquid drug product and a filling station configured for filling the liquid drug product into the containers. The filling station is fluidly coupled to the drug product preparer. A degasser is fluidly interposed between the drug product preparer and the filling station. The degasser has a membrane configured for at least partially separating off gas from the liquid drug product. Methods of (i) filling a liquid drug product into containers, (ii) increasing the accuracy of the filling weight of a liquid drug product in a container, (iii) increasing the stability oxygen-sensitive
(Continued)

active pharmaceutical ingredient in a liquid drug product, and (iv) reducing polysorbate aggregate formation in a liquid drug product are also disclosed.

17 Claims, 7 Drawing Sheets

(51) Int. Cl.
    *B01D 63/02*     (2006.01)
    *B65B 3/22*     (2006.01)
    *B65B 63/00*     (2006.01)

(52) U.S. Cl.
    CPC .......... *B65B 63/00* (2013.01); *B01D 2313/04* (2013.01); *B01D 2313/13* (2013.01); *B01D 2313/24* (2013.01)

(58) Field of Classification Search
    CPC .............. B01D 63/031; B01D 2313/04; B01D 2313/13; B01D 2313/24
    USPC ................................................ 53/428, 111 R
    See application file for complete search history.

(56) References Cited

U.S. PATENT DOCUMENTS

| | | |
|---|---|---|
| 6,312,742 B1 | 11/2001 | Wood et al. |
| 6,402,818 B1 * | 6/2002 | Sengupta ........... B01D 19/0031 96/6 |
| 6,503,225 B1 | 1/2003 | Kirsch et al. |
| 6,544,424 B1 * | 4/2003 | Shevitz ................. B01D 63/02 210/636 |
| 6,648,945 B1 | 11/2003 | Takeda et al. |
| 8,882,967 B1 | 11/2014 | Patel |
| 2004/0039366 A1 | 2/2004 | Macleod |
| 2007/0175538 A1 * | 8/2007 | Rothbauer et al. ..... B65B 3/003 141/59 |
| 2010/0281824 A1 | 11/2010 | Ansaloni et al. |
| 2011/0108158 A1 | 5/2011 | Huwiler et al. |
| 2012/0289900 A1 * | 11/2012 | Chong et al. ........... B65B 3/003 604/113 |
| 2013/0255498 A1 | 10/2013 | Shibata |
| 2015/0197359 A1 * | 7/2015 | Nohara et al. .......... B65B 3/003 53/425 |
| 2017/0225131 A1 * | 8/2017 | Morita et al. .......... B01D 69/02 |
| 2019/0106312 A1 * | 4/2019 | Semmler et al. ....... B65B 3/003 |

FOREIGN PATENT DOCUMENTS

| | | |
|---|---|---|
| AR | 076761 A1 | 7/2011 |
| CN | 1345255 A | 4/2002 |
| CN | 103228344 A | 7/2013 |
| CN | 107427743 A | 12/2017 |
| JP | H06-129347 A | 5/1994 |
| JP | H06-285301 A | 10/1994 |
| JP | H09-94447 A | 4/1997 |
| JP | 2005-536285 A | 12/2005 |
| WO | WO 99/32186 A1 | 7/1999 |
| WO | WO 2018/085892 A1 | 5/2018 |

OTHER PUBLICATIONS

Giannos et al., Formulation Stabilization and Disaggregation of Bevacizumab, Ranibizumab and Aflibercept in Dilute Solutions, Pharmaceutical Research, 2018, vol. 35, Article No. 78, 15 pages.

* cited by examiner

METHOD OF FILLING DEGASSED DRUG PRODUCT INTO CONTAINERS AND DRUG PRODUCT FILLING DEVICE

RELATED APPLICATIONS

This application is a continuation of PCT/EP2019/070198, filed Jul. 26, 2019, which claims priority to EP 18 186 014.9, filed Jul. 27, 2018, the entire disclosures of which are hereby incorporated herein by reference.

BACKGROUND

This disclosure relates to a drug product filling device, a method of filling at least one drug product into containers, a method of increasing the accuracy of the filling weight of a liquid drug product in a container, a method of increasing the stability of at least one oxygen-sensitive active pharmaceutical ingredient in a liquid drug product, and to a method of reducing polysorbate aggregate formation in a liquid drug product. The device and methods of this disclosure, as an example, may be used for filling liquid medical or pharmaceutical products into containers, such as into vials, syringes or ampoules. Other applications comprising the process of bottling a liquid and further requiring a removal of one or several gases from the liquid to be bottled, however, are also feasible.

Liquid solutions may contain gases in dissolved form or as bubbles or microbubbles. In many areas dealing with liquids, the removal of gases from the liquids is a common challenge since the presence of bubbles might interfere with specific processes or requirements, for example in the quality control the vials may be falsely rejected because bubbles are mistaken as particles during visual inspection. In order to remove or reduce the amount of gases in solutions, different devices and methods are commonly used. Thus, in order to reduce the amount of $CO_2$ dissolved in water, for example, to produce highly purified water for pharmaceutical purposes, different methods and devices have been employed including the use of chemicals such as NaOH which may convert $CO_2$ into carbonate that may subsequently be removed, e.g., by reverse osmosis. In order to meet the challenge of removing one or several gases from a liquid solution use may also be made of membrane-based modules such as Liqui-Cel® membrane contactors. Membrane-based methods and devices for the removal of gases from liquids are a solution commonly employed in a wide range of areas, such as for example in the area of water treatment, in chromatography, in the beverage industry, in the coatings and paint industry as well as in the production of high purity water for pharmaceutical purposes.

Medical or pharmaceutical products must further comply with a large number of safety regulations. Thus, the presence of particles in a liquid drug product must usually be prevented in order to reduce potential risks for the user of such products. Therefore, vials filled with such products are usually routinely visually inspected for the presence of particles using fully automated or semi-automated systems since the presence of particles might constitute a risk for a potential future user. Generally, these systems are often unable to distinguish between a particle and a bubble. Thus, the presence of bubbles in the drug products that are filled in containers may lead to an erroneous sorting out of containers since the bubbles may easily be mistaken for particles which might constitute a potential danger for a future user.

Drug product filling devices and methods of filling at least one drug product into containers which are known in the art usually comprise a degassing step of a bulk solution of the drug product which normally relies on the application of a vacuum. Despite the advantages of the methods and devices known in the art, numerous challenges remain to be tackled. Thus, after the degassing step the bulk solution is usually transferred to a filling device with the aid of gaseous nitrogen which generally causes a renewed input of gases such as nitrogen for example. A gas content in liquid drug products, however, may lead to a low accuracy of the filling weight of the liquid drug products contained in a container such as a syringe or a vial. Further, the devices and methods known in the art are more often than not incomplete and ineffective. Furthermore, they are usually time-consuming since they generally constitute a separate, non-continuous step that takes place in addition to the filling process. Additionally, stationary degassing of the bulk solution does usually not completely remove dissolved gases present in the solution.

SUMMARY

This disclosure teaches a drug product filling device, a method of filling at least one drug product into containers and a method of increasing the accuracy of the filling weight of a liquid drug product in a container, which at least partially avoid the drawbacks and disadvantages of known methods and devices of similar kind known in the art. Specifically, this disclosure teaches increasing the yield of containers filled with the liquid drug product.

As used in the following, the terms "have," "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B," "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one," "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once. It shall also be understood for purposes of this disclosure and appended claims that, regardless of whether the phrases "one or more" or "at least one" precede an element or feature appearing in this disclosure or claims, such element or feature shall not receive a singular interpretation unless it is made explicit herein. By way of non-limiting example, the terms "filling station," "degasser," "drug product preparer," and "liquid drug product," to name just a few, should be interpreted wherever they appear in this disclosure and claims to mean "at least one" or "one or more" regardless of whether they are introduced with the expressions "at least one" or "one or more." All other terms used herein should be similarly interpreted unless it is made explicit that a singular interpretation is intended.

Further, as used in the following, the terms "preferably," "more preferably," "particularly," "more particularly," "specifically," "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of this disclosure, a drug product filling device for filling at least one drug product into containers is disclosed. The drug product filling device comprises at least one drug product preparation device, the drug product preparation device being configured for preparing and/or storing the liquid drug product. The drug product filling device further comprises at least one filling station for filling the liquid drug product into the containers, the filling station being fluidically coupled to the drug product preparation device. The drug product filling device furthermore comprises at least one degassing device, the degassing device being fluidically interposed in between the drug product preparation device and the filling station and the degassing device comprising at least one membrane for at least partially separating off at least one gas from the liquid drug product.

The term "drug product" as used herein is a broad term and is to be given its ordinary and customary meaning to a person of ordinary skill in the art and is not to be limited to a special or customized meaning. The term specifically may refer, without limitation, to a solution, a liquid or a suspension that may be usable as a medication or that may be used or prepared in the process of producing a medication or a preparation or that may be used or prepared as an interstage, a precursor or a compound of a medication or a preparation. Thus, the drug product may for example be used as part of or in connection with a treatment of a disease, a prevention, a prophylaxis or a diagnostic analysis. The drug product may specifically comprise at least one gas, such as at least one gas that is dissolved in the solution, the liquid or the suspension of the drug product.

The term "filling device" as used herein is a broad term and is to be given its ordinary and customary meaning to a person of ordinary skill in the art and is not to be limited to a special or customized meaning. The term specifically may refer, without limitation, to a device configured for dispensing, releasing or conducting an arbitrary solution, liquid or suspension into receptacles or containers.

The term "container" as used herein is a broad term and is to be given its ordinary and customary meaning to a person of ordinary skill in the art and is not to be limited to a special or customized meaning. The term specifically may refer, without limitation, to an arbitrary container or receptacle configured for holding at least one liquid, such as, for example, a vial, in particular, a glass vial, a syringe or an ampoule.

The term "drug product preparation device" (also referred to herein as "drug product preparer") as used herein is a broad term and is to be given its ordinary and customary meaning to a person of ordinary skill in the art and is not to be limited to a special or customized meaning. The term specifically may refer, without limitation, to a device configured for being used in the process of making, producing, fabricating or storing a drug product. As an example, the drug product preparation device may comprise at least one of a mixing vessel, a reactor, a stirring device or agitator, a storing vessel, a tank, a transport vessel, e.g., a drug product transport container, and/or any other device suited for being used in the context of drug product preparation, drug product storage and/or drug product transportation.

The term "filling station" as used herein is a broad term and is to be given its ordinary and customary meaning to a person of ordinary skill in the art and is not to be limited to a special or customized meaning. The term specifically may refer, without limitation, to a device which may be part of the filling device as defined above and which is suited to fill the at least one drug product into the containers. The filling station may be or may comprise at least one liquid handling device which is configured for filling, dispensing or metering the drug product into the containers. Thus, as an example, the filling station may comprise at least one of a dispenser, a nozzle, a valve or the like. The filling station may further comprise at least one filling line. The filling station may be configured for filling a large number of containers in a sequential and/or in a parallel fashion. As an example, the filling station may comprise a number of N nozzles or dispensers for simultaneously filling the drug product into a batch of N containers, followed by a subsequent batch of N containers and so forth.

The term "fluidically coupled" as used herein is a broad term and is to be given its ordinary and customary meaning to a person of ordinary skill in the art and is not to be limited to a special or customized meaning. In this disclosure, the terms "fluidically" and "fluidly" are used synonymously and interchangeably. The terms "fluidically coupled" and "fluidly coupled" specifically may refer, without limitation, to a first device and a second device, wherein the first device and the second device are connected in such a way that an arbitrary fluid or an arbitrary liquid may be movable or transferable from the first device to the second device and/or vice versa.

The term "degassing device" (also referred to as a "degasser" herein) as used herein is a broad term and is to be given its ordinary and customary meaning to a person of ordinary skill in the art and is not to be limited to a special or customized meaning. The term specifically may refer, without limitation, to a device configured for at least partially separating off at least one gas of a liquid that is conducted through the degassing device. Therein, various physical principles may be used for separating off the gas. As an example, the degassing device may comprise, as will be outlined in further detail below, at least one degassing device based on osmosis. In addition, however, other principles may be used.

The term "fluidically interposed" (or "fluidly interposed") as used herein is a broad term and is to be given its ordinary and customary meaning to a person of ordinary skill in the art and is not to be limited to a special or customized meaning. The term specifically may refer, without limitation, to a device being connected to at least one first device and at least one second device such that an arbitrary fluid or an arbitrary liquid may be movable or transportable from the first device to the second device via the device that is fluidically interposed in between the first device and the second device.

The term "membrane" as used herein is a broad term and is to be given its ordinary and customary meaning to a person of ordinary skill in the art and is not to be limited to a special or customized meaning. The term specifically may refer, without limitation, to a three-dimensional object whose dimension in a first direction of extension falls below the dimension in a second and third direction of extension of the device such that a shape of the object may be described as a layer or as sheet-like, wherein the layer or sheet-like object is configured for at least partially delimiting or delineating a first space or compartment bordering on the object. Specifically the layer or sheet-like object may be configured for separating the first space or compartment from a second space or compartment. Specifically, the dimension in the first direction of extension may be referred to as a thickness of the membrane. In particular, the membrane may be configured to delimit or delineate the first space or compartment in at least one direction of extension of the first space or compartment. While at least partially delimiting or delineating the first space or compartment, the membrane may further at least partially connect the first space or compartment to the second space or compartment by being selectively permeable at least under certain conditions, which may for example comprise a pressure difference between a pressure in the first space or compartment and a pressure in the second space or compartment. The conditions may further comprise other parameters such as for example a temperature of the membrane and/or a temperature of the first space or compartment and/or a temperature of the second space or compartment or flow rate through the first compartment. While the membrane may be a selectively permeable membrane that may allow the passage of specific molecules such as gaseous nitrogen or other gas molecules in at least one direction, the membrane may specifically be a non-porous membrane and prevent a mixing, particularly an uncontrolled mixing, of a content of or a substance in the first space or compartment with a content of or a substance in the second space or compartment.

The expression "at least partially separating off at least one gas from the liquid drug product" as used herein is a broad term and is to be given its ordinary and customary meaning to a person of ordinary skill in the art and is not to be limited to a special or customized meaning. The term specifically may refer, without limitation, to at least partially removing or conducting away at least one gas from the liquid drug product such that an amount of gas that may be dissolved in the liquid drug product is reduced.

The degassing device comprises at least one membrane. The membrane may be a non-porous membrane. In one embodiment, the membrane may comprise at least one of the following materials: polydimethyldioxane (PDMS), cellulose acetate (CA), polysulfone (PS), polyether sulfone (PES), polyacrilonitrile (PAN), polyvinylidiene fluoride (PVDF), poylpropylene (PP), polyethylene (PE), polyvinyl chloride (PVC), polytetrafluoroethylene (PTFE) and silicone. In a preferred embodiment, the membrane comprises silicone. In particular, the membrane may have a thickness of 25 µm to 200 µm, preferably 25 µm to 100 µm, more preferably 40 µm to 70 µm, most preferably of 55 µm. The term "thickness" may in particular refer to the dimension of the membrane in the direction of extension. The degassing device may particularly be configured for applying a pressure difference over the membrane, with the liquid drug product being in contact with the membrane on a first side and with an opposing second side of the membrane being exposed to a lower pressure than the first side. Thus, the pressure difference may be the difference between the magnitude of the pressure on the first side and the magnitude of the pressure on the second side. Specifically, the pressure difference over the membrane may be 0.1 bar to 3.0 bar, preferably 0.6 bar to 1.0 bar, more preferably 0.8 bar. Further, the degassing device may comprise at least one of a vacuum source or a vacuum port for applying a vacuum to the second side. Specifically, the vacuum source may comprise at last one pump, such as a suction pump. As an example, the pump may comprise at least one positive displacement pump, e.g., one or more of a rotary vane pump, a lobe pump or the like. In particular, an absolute value of the vacuum applied to the second side may be 0.010 bar to 0.900 bar, preferably, 0.010 bar to 0.020 bar, more preferably 0.015 bar. The term "vacuum" as used herein is a broad term and is to be given its ordinary and customary meaning to a person of ordinary skill in the art and is not to be limited to a special or customized meaning. The term specifically may refer, without limitation, to an underpressure, a low pressure, a partial vacuum or a negative pressure. Thus, a space, chamber or compartment to which the vacuum is applied may have a lower pressure than another space, chamber or compartment to which no vacuum is applied. Specifically, the drug product, in the degassing device, may have an absolute pressure of 0.1 bar to 3.0 bar, preferably 0.6 bar to 1.0 bar, more preferably 0.8 bar.

In particular, the degassing device may comprise at least one hollow fiber membrane module comprising a plurality of hollow fibers, wherein the hollow fibers are at least partially formed by the membrane. The term "hollow fiber" as used herein is a broad term and is to be given its ordinary and customary meaning to a person of ordinary skill in the art and is not to be limited to a special or customized meaning. The term specifically may refer, without limitation, to a tube, a tubule or a capillary that at least partially defines or comprises an interior space or lumen. In particular, the interior space or lumen of the hollow fiber may also be referred to as the inside of the hollow fiber. Specifically, the hollow fibers may have an inner diameter and an outer diameter, wherein the inner diameter may have a value of 50 µm to 800 µm, preferably of 150 µm to 250 µm, more preferably a value of 190 µm, and wherein the outer diameter may have a value of 75 µm to 900 µm, preferably of 150 µm to 450 µm, more preferably a value of 300 µm. In particular, the thickness of the membrane may be 55 µm, the inner diameter of the hollow fiber may be 190 µm and the outer diameter of the hollow fiber may be 300 µm. Further, the plurality of hollow fibers of the hollow fiber membrane module may comprise a number of 30 hollow fibers to 30000 hollow fibers.

The number of the hollow fibers of the hollow fiber membrane module may in particular depend on a size of the hollow fiber membrane module, in particular on an overall membrane area, i.e., on the sum of membrane areas of all hollow fibers in the hollow fiber membrane module, and/or on a cross sectional area of the hollow fiber membrane module, wherein the cross sectional area may be perpendicular to a main direction of extension, in particular to a length, of the hollow fiber membrane module.

As an example, the fiber count per unit membrane area may be in the range of 1.0 to 4.0 fibers/cm$^2$, e.g., 1 to 3 fibers/cm$^2$, preferably 1 to 1.5 fibers/cm$^2$, more preferably 1.26 to 1.42 fibers/cm$^2$. Additionally or alternatively, the number of hollow fibers, specifically a fiber count, per cross sectional area unit of the hollow fiber membrane module may be 20 cm$^{-2}$ to 800 cm$^{-2}$, such as 40 cm$^{-2}$ to 500 cm$^{-2}$, e.g., 42 cm$^{-2}$ to 483 cm$^{-2}$.

Furthermore, a length of the hollow fibers may also depend on the size of the hollow fiber membrane module, specifically on the length of the hollow fiber membrane module. The hollow fibers may have a length of 10 cm to 16 cm, In particular, the degassing device may be or may comprise a PermSelect® Silicone Membrane Module as available from Med Array Inc., Ann Arbor, MI 48108, U.S.A., such as the hollow fiber membrane module PDMSXA-2500 and/or the hollow fiber membrane module PSMSXA-1.0.

As an example, hollow fiber membrane modules available by MedArray Inc., Ann Arbor, MI 48108, U.S.A., may be used. A summary of exemplary embodiments of membrane modules available by this supplier and their properties is given in Table 1:

TABLE 1

Exemplary embodiments of characteristic properties of exemplary embodiments of hollow fiber membrane modules.

| Hollow fiber membrane module | Fiber count | Membrane area [$cm^2$] | Module length [cm] | Module diameter [cm] | Cross-sectional module area [$cm^2$] | Fiber count per membrane area [$cm^{-2}$] | Fiber count per cross-sectional module area [$cm^{-2}$] |
|---|---|---|---|---|---|---|---|
| PDMSXA-10 tiny | 30 | 10 | 10.9 | 0.95 | 0.71 | 3.00 | 42.32 |
| PDMSXA 1000 | 1280 | 1000 | 16.0 | 2.86 | 6.42 | 1.28 | 199.25 |
| PDMSXA 2500 | 3200 | 2500 | 14.0 | 3.5 | 9.62 | 1.28 | 332.60 |
| PDMSXA 7500 | 9600 | 7500 | 14.0 | 5.4 | 22.90 | 1.28 | 419.17 |
| PDMSXA-1.0 | 12600 | 10000 | 14.0 | 6.0 | 28.27 | 1.26 | 445.63 |
| PDMSXA 2.1 | 30000 | 21000 | 14.2 | 8.9 | 62.21 | 1.43 | 482.23 |

The hollow fibers may, specifically, form fiber bundles. The term "fiber bundle" as used herein is a broad term and is to be given its ordinary and customary meaning to a person of ordinary skill in the art and is not to be limited to a special or customized meaning. The term specifically may refer, without limitation, to a plurality of fibers, which are combined or held together, for example such that a common alignment and/or orientation of the fibers is achieved. In particular, the fiber bundles, on both ends, may be embedded in a sealing. Further, ends of the fiber bundles may be connected to connection ports. The term "connection port" as used herein is a broad term and is to be given its ordinary and customary meaning to a person of ordinary skill in the art and is not to be limited to a special or customized meaning. The term specifically may refer, without limitation, to an arbitrary device configured for holding or receiving at least one end of at least one fiber bundle in order to directly or indirectly join, affiliate or link the end of the fiber bundle to a further element or component. The hollow fiber membrane module may further comprise at least one housing, the housing having the hollow fibers disposed therein. Furthermore, the hollow fiber membrane module may comprise at least one fiber entry port connected to a first end of the hollow fibers, at least one fiber exit port connected to a second end of the hollow fibers, and at least one housing entry port and at least one housing exit port, both the housing entry port and the housing exit port being connected to at least one inner space inside the housing between the hollow fibers and a wall of the housing.

The term "fiber entry port" as used herein is a broad term and is to be given its ordinary and customary meaning to a person of ordinary skill in the art and is not to be limited to a special or customized meaning. The term specifically may refer, without limitation, to an arbitrary device configured for holding or receiving the first end of the fiber bundle in order to directly or indirectly join, affiliate or link the first end of the fiber bundle to a further element or component, e.g., the preparation device, such that a fluid, in particular a gas or a liquid, may be introduced into the fibers via the fiber entry port. In particular, in the case of the fluid being a gas, the fiber entry port may also be used as a fiber exit port. Thus, as described further below, a vacuum may be applied to the inside of the hollow fiber by connecting one or both of the fiber entry port and the fiber exit port to a suction device. The term "fiber exit port" as used herein is a broad term and is to be given its ordinary and customary meaning to a person of ordinary skill in the art and is not to be limited to a special or customized meaning. The term specifically may refer, without limitation, to an arbitrary device configured for holding or receiving the second end of the fiber bundle in order to directly or indirectly join, affiliate or link the first end of the fiber bundle to a further element or component, e.g., the filling station, such that a fluid, in particular a gas or a liquid, contained in the hollow fibers of the fiber bundle may be exported from the hollow fibers via the fiber exit port. In particular, the connection port connected to one end of the fiber bundle may be implemented as the fiber entry port and the connection port at the other end of the fiber bundle may be implemented as the fiber exit port. Further, the fiber entry port and/or the fiber exit port may also be used as the vacuum port.

The term "housing entry port" as used herein is a broad term and is to be given its ordinary and customary meaning to a person of ordinary skill in the art and is not to be limited to a special or customized meaning. The term specifically may refer, without limitation, to an arbitrary device configured for directly or indirectly joining, affiliating or linking an inner space of the housing to a further element or component, e.g., the preparation device, such that a fluid, in particular a gas or a liquid, may be introduced into the inner space of the housing via the fiber entry port. In particular, in the case of the fluid being a gas, the housing entry port may also be used as a housing exit port. Further, the housing entry port and/or the housing exit port may also be used as the vacuum port. Thus, as described further below, a vacuum may be applied to the inner space by connecting one or both of the housing entry port and the housing exit port to a suction device. The term "housing exit port" as used herein is a broad term and is to be given its ordinary and customary meaning to a person of ordinary skill in the art and is not to be limited to a special or customized meaning. The term specifically may refer, without limitation, to an arbitrary device configured for directly or indirectly joining, affiliating or linking the inner space of the housing to a further element or component to a further element or component, e.g., the filling station, such that a fluid, in particular a gas or a liquid, contained in inner space of the housing may be exported from the inner space of the housing via the housing exit port.

The hollow fiber membrane module may be fluidically interposed in between the drug product preparation device (for example a compounding area) and the filling station in a way selected from the group consisting of:
  i) the fiber entry port may be directly or indirectly fluidically connected to the drug product preparation device, and the fiber exit port may be directly or indirectly fluidically connected to the filling station; or
  ii) the housing entry port may be directly or indirectly fluidically connected to the drug product preparation device, and the housing exit port may be directly or indirectly fluidically connected to the filling station.

Particularly, option i) may be selected, wherein one or both of the housing entry port and the housing exit port may be connected to a suction device such as for example a vacuum pump, specifically for applying a vacuum to the inner space of the housing. Furthermore, option ii) may be chosen, wherein one or both of the fiber entry port and the fiber exit port may be connected to a suction device, specifically for applying a vacuum to the inside of the hollow fibers.

The drug product filling device comprises at least one membrane. Specifically, the membrane may comprise at least one material selected from the group consisting of: polydimethylsiloxane (PDMS); cellulose acetate (CA), polysulfone (PS), polyether sulfone (PES), polyacrilonitrile (PAN), polyvinylidiene fluoride (PVDF), poylpropylene (PP), polyethylene (PE), polyvinyl chloride (PVC), polytetrafluoroethylene (PTFE) and silicone, preferably the membrane comprises silicone. Further, the degassing device may have at least one entry port connected to the drug product preparation device and at least one exit port connected to the filling station. Furthermore, the degassing device may be interposed, specifically fluidically interposed, in between the drug product preparation device and the filling station in an in-line fashion. Thus, the degassing of the liquid drug product may take place as a step of a series of sequentially performable steps in the processes of filling the liquid drug product into containers. The drug product filling device may further comprise at least one in-line filtering device fluidically interposed in between the drug product preparation device and the filling station. In particular, the in-line filtering device may comprise a sterile filter. The in-line filtering device may further comprise a prefilter, specifically a prefilter for reducing a bioburden. Further, the degassing device may be at least partially sterilizable. In particular, the degassing device may be at least partially sterilizable by at least one of the following means: gamma radiation; beta radiation; steam; autoclavation; sterilization in place, which may also be abbreviated as SIP. Specifically, the membrane of the degassing device may be sterilizable. Further, at least one of the following elements which may form part of the degassing device may be sterilizable: the hollow fibers, the sealing, the connection ports, the housing, the fiber entry port, the fiber exit port, the housing entry port, the housing exit port. Preferably, all elements of the degassing device may be sterilizable. Further, a sterilization process of the above-mentioned elements may specifically take place as a sterilization-in-place. Thus, areas in contact with the drug product may be sterilizable without substantial disassembly of the drug product preparation device. The drug product filling device may further comprise at least one transfer system configured for transferring the drug product from the drug product preparation device to the filling station. The at least one transfer system may be or may comprise at least one pressure transfer system that has at least one gas supply, the pressure transfer system being configured for transferring the drug product from the drug product preparation device to the filling station by pressure. In particular, the gas supply may supply nitrogen. Additionally or alternatively, the at least one transfer system may be or may comprise at least one pump. Further, the pressure for transferring the drug product from the drug product preparation device to the filling station may be of 0.8 bar to 1.0 bar. This pressure may in particular be an absolute pressure.

The drug product filling device comprises the at least one filling station. The filling station, in particular the filling line, may particularly comprise at least one inspection device for optically inspecting the containers after filling with the liquid drug product. The filling station, in particular the filling line, may further comprise at least one selection device having at least one controller for automatically recognizing defective containers and for automatically removing defective containers. Specifically, the inspection device may comprise at least one camera and at least one image recognition device. Furthermore the filling station, in particular the filling line, further may comprise at least one closing station for closing the containers, for example by at least one stopper. The closing station may further comprise at least one crimping station for fixation of the stopper by crimping. Additionally or alternatively other devices for closing the containers may be used and applied to the containers by the closing station such as caps that may in particular comprise or be made of plastic and/or aluminum, e.g., Plascap® manufactured by Daikyo. Furthermore, the closing station may specifically comprise a sealing station, e.g., for sealing ampoules.

The drug product filling device comprises the at least one drug product preparation device. The drug product preparation device may be configured for preparing the liquid drug product from at least two components. The drug product preparation device may specifically comprise at least one mixing vessel for mixing at least two components of the drug product. The mixing vessel may comprise at least one stirring device for stirring the drug product. The drug product preparation device may further comprise at least one storage vessel, wherein the storage vessel may be fluidically connected to the filling station. The storage vessel may particularly comprise at least one tempering device for one or both of cooling or heating the drug product. The storage vessel may specifically comprise at least one gas supply for supplying at least one shielding gas into the storage vessel and for storing the drug product under the shielding gas. In particular, the gas supply may comprise at least one nitrogen supply.

The at least one drug product that is filled into containers by the drug product filling device may have a viscosity of 0.2 mPa s to 30 mPa s, preferably of 1 mPa s to 20 mPa s, more preferably, 1 mPa s to 5 mPa s, most preferably, 1 mPa s to 1.5 mPa s. The at least one membrane of the drug product filling device may have a contact area for being in contact with the drug product, wherein a size of the contact area may be of 10 $cm^2$ to 5 $m^2$, preferably of 0.5 $m^2$ to 1.5 $m^2$, more preferably the size of the contact area may be about 1 $m^2$. The drug product filling device may be configured for conducting the drug product through the degassing device at a rate of 5 L/h to 150 L/h, preferably of 60 L/h to 100 L/h, more preferably of 70 L/h to 90 L/h. In particular, the drug product may have a temperature of 0° C. to 25° C., preferably 0 to 8° C. or 15-25° C.; more preferably 2 to 8° C. or 18° C. to 24° C.

As an example, for the exemplary embodiments of the hollow fiber membrane modules of Table 1 above, the following flow rates given in Table 2 may be used:

TABLE 2

Exemplary flow rates for the embodiments of the hollow fiber membrane modules of Table 1.

| Membrane module | Flow rate [L/min] |
| --- | --- |
| PDMSXA-10 tiny | 0.001-0.01 |
| PDMSXA 1000 | 0.2-1.9 |
| PDMSXA 2500 | 0.2-1.9 |
| PDMSXA 7500 | 0.5-6 |
| PDMSXA-1.0 | 0.5-6 |
| PDMSXA 2.1 | 2.75-19 |

The drug product filling device may further comprise a coupling bow having at least one first coupling access and at least one second coupling access, wherein the degassing device may be fluidically connectable to the drug product preparation device via the first coupling access, wherein the degassing device may be fluidically connectable to the filling station via the second coupling access. In particular, the degassing device may be directly or indirectly fluidically connectable to the drug product preparation device via the first coupling access and the degassing device may be directly or indirectly connectable to the filling station via the second coupling access. In case of a direct fluidic connection between the degassing device and the first coupling access and/or the second coupling access the degassing device may be directly attached to the first coupling access and/or the second coupling access, respectively. In case of an indirect fluidic connection between the degassing device and the first coupling access and/or the second coupling access the degassing device may be attached to the first coupling access and/or the second coupling access, respectively, via at least one further element, such as a tube, a hose or a pipe. The term "fluidically connectable" as used herein is a broad term and is to be given its ordinary and customary meaning to a person of ordinary skill in the art and is not to be limited to a special or customized meaning. The term specifically may refer, without limitation, to a first device and a second device, wherein the first device and the second device can be connected in such a way that an arbitrary fluid or an arbitrary liquid may be movable or transferable from the first device to the second device and/or vice versa. Within the scope of this disclosure, the terms "fluidically connected" and "fluidically coupled" may be used interchangeably.

The coupling bow may further comprise at least one holder for mounting the degassing device. Additionally or alternatively, the drug product filling device, in particular the drug product preparation device and/or the filling station, may comprise the holder for mounting the degassing device. In particular the holder may be configured to removably receive the degassing device.

In a second aspect of this disclosure a method of filling at least one drug product into containers is disclosed. The method comprises the steps disclosed in the following. The steps may specifically be performed in the given order. Still, a different order is possible. The method may comprise additional steps which are not mentioned. It is further possible to perform one or more of the method steps repeatedly. Further, two or more of the method steps may be performed in a timely overlapping fashion or simultaneously.

The method comprises the following steps:
A) providing at least one drug product filling device configured for filling at least one liquid drug product into containers comprising:
   providing at least one drug product preparation device, the drug product preparation device being configured for preparing a liquid drug product;
   providing at least one filling station for filling the liquid drug product into the containers, the filling station being fluidically coupled to the drug product preparation device;
   providing at least one degassing device being fluidically interposed in between the drug product preparation device and the filling station and the degassing device comprising at least one membrane for separating off at least one gas from the liquid drug product;
B) conducting the drug product from the drug product preparation device to the filling station, wherein the drug product is at least partially degassed upon passing through the degassing device; and
C) filling the at least partially degassed drug product into the containers by means of the filling station.

In particular, step B) of the method may further comprise:
applying a pressure difference over the membrane using the degassing device, with the liquid drug product being in contact with the membrane on a first side and with an opposing second side of the membrane being exposed to a lower pressure than the first side.

In particular, the degassing device provided in method step A) may be configured for applying the pressure difference over the membrane by comprising at least one of a vacuum source or a vacuum port for applying a vacuum to the second side. The degassing device may further comprise at least one hollow fiber membrane module comprising a plurality of hollow fibers, wherein the hollow fibers are at least partially formed by the membrane. The hollow fibers may form fiber bundles.

Further, step B) may specifically comprise:
conducting the drug product from the drug product preparation device to the filling station by at least sectionally using at least one of: a stream of transport gas and a pump.

In particular, the transport gas may be nitrogen. For a description of possible embodiments and definitions of devices used in the method, reference may be made to the embodiments, definitions and descriptions as described above or as described further below. Specifically, the drug product filling device as provided in method step A) may be a drug product filling device as described above or as described further below. Still, other embodiments are feasible.

The method may comprise an increasing of the accuracy of the filling weight of the liquid drug product in the container. The increasing of the accuracy of the filling weight of the liquid product in the container may comprise preparing the at least one liquid drug product, degassing the liquid drug product by at least partially separating off at least one gas from the liquid drug product by using a degassing device, the degassing device comprising at least one membrane; and filling the degassed liquid drug product into the container.

The method may further comprise an increasing of the stability of at least one oxygen-sensitive active pharmaceutical ingredient in the liquid drug product. The increasing of the stability of the oxygen-sensitive active pharmaceutical ingredient in the liquid drug product may comprise preparing the at least one liquid drug product, the liquid drug product comprising the at least one oxygen-sensitive active pharmaceutical ingredient. Further, the increasing of the stability of the oxygen-sensitive active pharmaceutical ingredient in the liquid drug product may comprise degassing the liquid drug product by at least partially separating off at least one gas from the liquid drug product by using the degassing device, the degassing device comprising the membrane.

The method may further comprise reducing polysorbate aggregate formation in the liquid drug product. The reducing of the polysorbate aggregate formation in the liquid drug product may comprise preparing the at least one liquid drug product, the liquid drug product comprising at least one oxygen-sensitive active pharmaceutical ingredient, specifically a protein, and at least one polysorbate. Further, the reducing of the polysorbate aggregate formation in the liquid drug product may comprise degassing the liquid drug product by at least partially separating off at least one gas from the liquid drug product by using the degassing device, the degassing device comprising the membrane.

In a third aspect of this disclosure a method of increasing the accuracy of the filling weight of a liquid drug product in a container, is disclosed. The method comprises the steps disclosed in the following. The steps may specifically be performed in the given order. Still, a different order is possible. The method may comprise additional steps which are not mentioned. It is further possible to perform one or more of the method steps repeatedly. Further, two or more of the method steps may be performed in a timely overlapping fashion or simultaneously.

The method comprises the following steps:
 I. preparing the at least one liquid drug product;
 II. degassing the liquid drug product by at least partially separating off at least one gas from the liquid drug product by using a degassing device, the degassing device comprising at least one membrane;
 III. filling the degassed liquid drug product into the container.

For possible definitions of most of the terms used herein, reference may be made to the disclosure of the drug product filling device or to the method of filling at least one drug product into containers as disclosed above or as disclosed in further detail below.

The term "increasing" as used herein is a broad term and is to be given its ordinary and customary meaning to a person of ordinary skill in the art and is not to be limited to a special or customized meaning. The term specifically may refer, without limitation, to the fact that a characteristic number or figure characterizing a specific property of an object or a process is higher when using the method as described, as compared to using other methods.

Thus, for quantifying the accuracy of the filling weight, the nominal filling weight of the liquid drug product in the container may be compared with the actual filling weight, thereby generating information on the deviation, such as generating a standard deviation. The lower the deviation, the higher the filling weight accuracy may be. By comparing the deviation of liquid drug products filled in a container by using conventional methods, specifically methods not containing method step II. of degassing the liquid drug product, with liquid drug products filled by using the method according to this disclosure, the reduction of the deviation and, thus, the increase in filling weight may be verified, specifically if the method, apart from the degassing step, is identical.

The method of increasing the accuracy of the filling weight of a liquid drug product in a container may specifically comprise using the degassing device and/or the drug product filling device as described above and/or as described further below.

TABLE 3

Exemplary characteristic properties of containers filled with liquid drug product either by a conventional drug product filling device or by exemplary embodiments of the drug product filling device according to this disclosure comprising the PDMSXA - 1.0 hollow fiber membrane module from MedArray, Inc.

| | average filling weight ± σ | rejected containers due to particle detection | rejected containers due to bubble detection |
|---|---|---|---|
| conventional drug product filling device | 15.394 g ± 0.113 g | 43.21% | 9.24% |
| drug product filling device according to this disclosure, parameter set 1 | 15.450 g ± 0.102 g | 19.17% | 6.41% |
| drug product filling device according to this disclosure, parameter set 2 | 15.450 g ± 0.102 g | 7.82% | 6.16% |
| drug product filling device according to this disclosure, parameter set 3 | 15.434 g ± 0.048 g | 5.14% | 6.15% |
| drug product filling device according to this disclosure, parameter set 4 | 15.418 g ± 0.038 g | 6.03% | 7.02% |

Table 3 displays exemplary characteristic properties of containers filled with liquid drug product either by a conventional drug product filling device or by exemplary embodiments of the drug product filling device according to this disclosure comprising the PDMSXA—1.0 hollow fiber membrane module from MedArray, Inc. For each condition displayed by a row of Table 3, at least 2900 containers were filled with the liquid drug product. The data displayed is generated by first using a conventional drug product filling device and then modifying the conventional drug product filling device to generate a drug product filling device according to this disclosure by implementing modifications such as the use of the degassing device. Parameter set 1 and parameter set 2 correspond to the parameters used for the conventional drug product filling device. Since the data are acquired in a temporally sequential manner, considerable amounts of gas or gases may still be present, e.g., in the drug product filling device during measurements displayed as parameter set 1. A degassing effect thus increases over time as visible, e.g., in the measurements of parameter set 2 as compared to parameter set 1. Modifications of the drug product filling device for parameter set 3 comprise a slowing of squeezers of dosing tubes of the drug product preparation device and may contribute to a further increase of the filling weight accuracy and a further decrease of the number of containers rejected due to particle detection. Modifications of the drug product filling device for parameter set 4 comprise the use of tubes with a diameter of 3 mm instead of 5 mm as well as an increase of ventilation cycles and may further increase the filling weight accuracy while slightly increasing the number of containers rejected due to particle detection as well as the number of containers rejected due to bubble detection. The standard deviation is denominated in Table 3 as a.

In a fourth aspect of this disclosure a method of increasing the stability of at least one oxygen-sensitive active pharmaceutical ingredient in a liquid drug product, specifically a liquid drug product in a container, is disclosed. Specifically, the oxygen-sensitive active pharmaceutical ingredient may be or may comprise a protein. The method comprises the steps disclosed in the following. The steps may specifically be performed in the given order. Still, a different order is possible. The method may comprise additional steps which are not mentioned. It is further possible to perform one or more of the method steps repeatedly. Further, two or more of the method steps may be performed in a timely overlapping fashion or simultaneously.

The method comprises the following steps:
α. preparing the at least one liquid drug product, the liquid drug product comprising at least one oxygen-sensitive active pharmaceutical ingredient; and
β. degassing the liquid drug product by at least partially separating off at least one gas from the liquid drug product by using a degassing device, the degassing device comprising at least one membrane.

For possible definitions of most of the terms used herein, reference may be made to the disclosure of the drug product filling device or to the method of filling at least one drug product into containers as disclosed above or as disclosed in further detail below.

The term "liquid drug product" as used in the context of the method of increasing the stability of the oxygen-sensitive active pharmaceutical ingredient, specifically may refer to a liquid product which comprises a drug and a solvent. The drug product comprised in the liquid drug product may be an oxygen-sensitive active pharmaceutical ingredient, such as at least one protein or a pharmaceutical ingredient comprising at least one protein, or may comprise at least one oxygen-sensitive active pharmaceutical ingredient, specifically at least one protein. However, the liquid drug product may also comprise a protein for other purposes, e.g., as stabilizer or carrier for the drug. The method of increasing the stability of the at least one oxygen-sensitive active pharmaceutical ingredient in a liquid drug product may in particular comprise increasing the stability of the protein that the liquid drug product may comprise for the purposes of stabilizing or carrying the drug. The method of increasing the stability of the at least one oxygen-sensitive active pharmaceutical ingredient in a liquid drug product may also comprise increasing the stability of the protein that the liquid drug product may comprise for other purposes.

The term "oxygen-sensitive active pharmaceutical ingredient" as used herein is a broad term and is to be given its ordinary and customary meaning to a person of ordinary skill in the art and is not to be limited to a special or customized meaning. The term may specifically refer, without limitations, to a component that may form part of a drug product and that may contribute to the correct functioning of the drug product, e.g., by mediating a medical effect of the drug product, by contributing to the medical effect of the drug product or by mediating of contributing to qualities of the drug product that support its correct functioning, such as the stability or storability of the drug product. The active pharmaceutical ingredient specifically may be prone to oxidation, thereby changing one or more of its chemical nature, its chemical structure or its chemical, physical or biological properties. Additionally or alternatively, the active pharmaceutical ingredient may be oxygen-sensitive in a sense that one or more of the chemical, physical or biological nature or properties of the active pharmaceutical ingredient are affected by the presence of oxygen.

The term "stability of an oxygen-sensitive active pharmaceutical ingredient" as used herein is a broad term and is to be given its ordinary and customary meaning to a person of ordinary skill in the art and is not to be limited to a special or customized meaning. The term specifically may refer, without limitation, to the capability of an oxygen-sensitive active pharmaceutical ingredient, such as a protein, to maintain its structural integrity and/or functional integrity.

The structural integrity of the oxygen-sensitive active pharmaceutical ingredient, such as the protein, may be affected by degradation processes, i.e., the oxygen-sensitive active pharmaceutical ingredient, in particular the protein, in its entirety or parts thereof may be degraded. Such degraded oxygen-sensitive active pharmaceutical ingredient, in particular proteins, are typically characterized by an impairment of the primary structure, e.g., accompanied by a lower molecular weight. Moreover, typically, degradation products such as shorter proteins or peptides as degradation products may occur.

The structural integrity of an oxygen-sensitive active pharmaceutical ingredient, in particular a protein, may be determined by various suitable technologies well known to those skilled in the art. Typically, structural integrity can be determined by analyzing a liquid drug product comprising at least one oxygen-sensitive active pharmaceutical ingredient, in particular at least one protein, or a sample thereof by spectroscopic techniques such as mass spectroscopy (MS) or NMR spectroscopy. Moreover, protein separation technologies such as gel electrophoresis, such as polyacrylamide gel electrophoresis (PAGE) or chromatography, such as size exclusion or molecular sieve chromatography, may be applied.

Besides or in addition to structural integrity, the functional integrity of an oxygen-sensitive active pharmaceutical ingredient, in particular a protein, may be affected as well. Accordingly, an oxygen-sensitive active pharmaceutical ingredient, in particular a protein, with impaired functional integrity shall be unable to exert its normal biological function. The functional integrity may be affected by degradation processes as well, i.e., degradation of an oxygen-sensitive active pharmaceutical ingredient, in particular a protein will, typically, also result in loss of its function. Moreover, the functional integrity as meant herein also encompasses other causes which result in an impairment of the function of an oxygen-sensitive active pharmaceutical ingredient, in particular a protein, e.g., impaired folding as well as impairment of posttranslational modifications, such as impaired glycosylation, phosphorylation or myristylation. Typically, the quaternary, tertiary and/or secondary structure of an oxygen-sensitive active pharmaceutical ingredient, in particular a protein, may be impaired in such a case.

There are also various suitable technologies well known to those skilled in the art for determining the functional integrity of an oxygen-sensitive active pharmaceutical ingredient, in particular a protein. It will be understood that a suitable technique in this context depends on the nature of the oxygen-sensitive active pharmaceutical ingredient, in particular the protein. In case of an enzyme, e.g., a suitable technique for determining the functional integrity may be an assay measuring the enzymatic activity. In case of a growth factor, cytokine or other stimulating agent, a suitable technique may be an assay measuring the capability of the compound for stimulating or preventing a biological response. Further, the immunological properties of an oxygen-sensitive active pharmaceutical ingredient, in particular a protein, may also be determined by immunological techniques such as antibody binding assays or affinity chromatography.

Under "increasing the stability of at least one oxygen-sensitive active pharmaceutical ingredient" it is to be understood that the structural and/or functional integrity of an oxygen-sensitive active pharmaceutical ingredient, in particular a protein shall, compared to a reference, be maintained over a prolonged time and/or shall be maintained under inferior conditions for stability of the oxygen-sensitive active pharmaceutical ingredient, in particular the protein, such as, e.g., heat, acidic or basic pH or under oxidizing or reducing conditions.

The increase in stability of the oxygen-sensitive active pharmaceutical ingredient, such as the protein, due to applying the method of this disclosure as referred to herein may be determined by comparing the stability of the oxygen-sensitive active pharmaceutical ingredient, in particular the protein, i.e., the structural and/or functional integrity of an oxygen-sensitive active pharmaceutical ingredient, in particular a protein, in a sample of a liquid drug product which has been treated by the method of this disclosure and the stability of the oxygen-sensitive active pharmaceutical ingredient, specifically the protein, of a sample of a control liquid drug product, e.g., a liquid drug product which has not been treated by the method of this disclosure. A successful treatment will be accompanied by an increase in stability of the oxygen-sensitive active pharmaceutical ingredient, particularly the protein, in the treated sample versus the control sample. Typically, such a comparison of stability determinations may be done at various time points in the future after treatment, e.g., in a time course measurement.

Thanks to the method of this disclosure, stability of the oxygen-sensitive active pharmaceutical ingredients, in particular the proteins, in liquid drug products can be significantly increased which results in, e.g., better storage or transport capabilities for the product.

The method of increasing the stability of the oxygen-sensitive active pharmaceutical ingredient, specifically the protein, in a liquid drug product may comprise using the degassing device and/or the drug product filling device as described above and/or as described further below.

The method may further comprise the following step:
γ. filling the degassed liquid drug product into at least one container.

In a fifth aspect of this disclosure a method of reducing the formation of polysorbate aggregate formation in a liquid drug product, specifically a liquid drug product in a container, is disclosed. The method comprises the steps disclosed in the following. The steps may specifically be performed in the given order. Still, a different order is possible. The method may comprise additional steps which are not mentioned. It is further possible to perform one or more of the method steps repeatedly. Further, two or more of the method steps may be performed in a timely overlapping fashion or simultaneously.

The method comprises the following steps:
X. preparing the at least one liquid drug product, the liquid drug product comprising at least one oxygen-sensitive active pharmaceutical ingredient, specifically a protein, and at least one polysorbate; and
Y. degassing the liquid drug product by at least partially separating off at least one gas from the liquid drug product by using a degassing device, the degassing device comprising at least one membrane.

For possible definitions of most of the terms used herein, reference may be made to the disclosure of the drug product filling device or to the method of filling at least one drug product into containers as disclosed above or as disclosed in further detail below.

The term "polysorbate" as used herein is a broad term and is to be given its ordinary and customary meaning to a person of ordinary skill in the art and is not to be limited to a special or customized meaning. The term specifically may refer, without limitation, to a class of non-ionic surfactants used, typically, as emulsifiers. Polysorbates are derived from ethoxylated sorbitan by esterification with fatty acids. Polysorbates are used, typically, in pharmaceuticals or food preparations. Typical examples of polysorbates include but are not limited to Polysorbate 20, Polysorbate 40, Polysorbate 60 and Polysorbate 80.

The term "polysorbate aggregate" as used herein is a broad term and is to be given its ordinary and customary meaning to a person of ordinary skill in the art and is not to be limited to a special or customized meaning. The term specifically may refer, without limitation, to accumulations of polysorbate molecules. These polysorbate aggregates may be, e.g., found in solutions comprising polysorbates stored at room temperature.

The term "reducing the formation of polysorbate aggregate formation" as used herein is a broad term and is to be given its ordinary and customary meaning to a person of ordinary skill in the art and is not to be limited to a special or customized meaning. The term specifically may refer, without limitation, to the fact that the number of aggregates formed by or comprising polysorbate molecules and/or a capability of polysorbate molecules to form or contribute to a generation of aggregates comprising polysorbate molecules in a liquid drug product shall be reduced compared to a control product after applying the method as described above. A typical control product in this context may be a liquid drug product which has not been treated by the method of this disclosure.

Experimental techniques to determine aggregation formation, typically, include spectrometric methods, such as optical spectroscopy and light scattering techniques, or size exclusion chromatography methods.

The reduced formation of polysorbate aggregate formation due to applying the method of this disclosure as referred to herein may be determined by comparing the number of polysorbate aggregates formed in a sample of a liquid drug product which has been treated by the method of this disclosure and the number of polysorbate aggregates formed in a sample of a control liquid drug product, e.g., a liquid drug product which has not been treated by the method of this disclosure. A successful treatment will be accompanied by reduction of the number of aggregates in the treated sample versus the control sample. Typically, such a comparison of polysorbate aggregate determinations may be done at various time points in the future after treatment, e.g., in a time course measurement.

Thanks to the method of this disclosure, the formation of disadvantageous polysorbate aggregates in liquid drug products can be significantly increased which results in, e.g., better storage and handling capabilities for the product as well as better biocompatibility.

The method of reducing the formation of polysorbate aggregate formation in a liquid drug product may comprise using the degassing device and/or the drug product filling device as described above and/or as described further below.

The method may further comprise the following step:

Z. filling the degassed liquid drug product into at least one container.

The proposed methods and device, in particular the drug product filling device the method of filling at least one drug product into containers and the method of increasing the accuracy of the filling weight of a liquid drug product in a container, provide a large number of advantages over known methods and devices of similar kind.

In particular, the proposed methods and device may reduce the amount of gas dissolved in or comprised by the liquid drug product. The proposed methods and device may thus reduce or suppress a presence, a formation or a nucleation of gas bubbles in the drug product, specifically in the drug product filled in containers. Gas bubbles comprised by the drug product in the container may mistakenly be identified as particles, e.g., by an optical inspection of the containers after filling the containers with the liquid drug product. This may lead to an erroneous identification of the filled container as being defective, e.g., by a fully or partially automated inspection machine, and may thus lead to an erroneous identification of filled containers as rejects. The proposed methods and device may reduce the erroneous identification of filled containers as rejects due to the presence of bubbles and may increase the yield by at least partially separating off the at least one gas from the liquid drug product. Further, the proposed methods and device may reduce a need, expenses and/or costs for steps or measures necessary to identify containers filled with drug product, which were separated out erroneously. Thus, the proposed methods and device may increase the yield of the containers filled with liquid drug product by means of removing of reducing gas bubbles that could be mistaken for particles during a visual inspection.

Further, the proposed methods and device may be less time-consuming than known methods and devices since the proposed methods and device may take place continuously, such as in an in-line fashion, as part of the filling of the liquid drug product into containers and not as a separate step as is common for methods and devices of similar kind known in the art. Moreover, the proposed methods and device may render one or several steps unnecessary, such as, for example, a temporary storage of the containers filled with drug product, which may specifically take several hours or even days, before an optical inspection may be carried out. Thus, the proposed methods and device may reduce costs, time and/or effort involved in the process of filling the liquid drug product into containers. Thus, the efficiency of filling the liquid drug product into containers may be increased.

Furthermore, it may be possible that the proposed method and device may be more effective in separating off the at least one gas from the liquid drug product than methods and devices of similar kind known in the art. In particular, it may be possible that the proposed method and device may completely or partially avert a renewed import or discharge of the at least one gas into the liquid drug product after use of the proposed device or after performing the proposed method since the gas may be separated off from the liquid drug product directly before the drug product is filled into the containers. In particular, a renewed contact of the liquid drug product with gases, e.g., with gaseous nitrogen, may be avoided.

Moreover, it may be possible that at least partially separating off at least one gas from the liquid drug product may have no effect on the concentration of the drug product, specifically on the concentration of one or several active components of the liquid drug product. Alternatively, at least partially separating off at least one gas from the liquid drug product may have a negligible effect on the concentration of the drug product, specifically on the concentration of one or several active components of the liquid drug product. Further, it may be possible that the degassing device may comprise only materials which are approved for being used in producing drug products, in particular approved by the Food and Drug Administration.

Further, it may be possible that the proposed method of filling at least one liquid drug product into containers, the proposed method of increasing the accuracy of the filling weight of a liquid drug product in a container and/or the proposed drug product filling device may increase the accuracy of the filling weight of the liquid drug product in the container as compared to methods and devices of similar kind known in the art. Evidence may, e.g., be found in the experimental data displayed in Table 3. The increased accuracy as compared to conventional methods and devices of similar kind may in particular be due to at least partially separating off at least one gas from the liquid drug product since the presence of gas, e.g., in the form of bubbles may for example reduce the portion of liquid drug product comprised in a given volume.

Furthermore, it may be possible that the proposed methods and device may contribute to a stability of the liquid drug product, specifically to the at least one active component of the liquid drug product, in particular by at least partially separating off at least one gas from the liquid drug product. This may be due to the fact that the presence of microbubbles may induce or support a formation of aggregates of molecules, in particular molecules acting as active components of a drug product such as proteins, protein fragments, antibodies and antibody fragments, as suggested, e.g., by Giannos and colleagues (Giannos S A, Kraft E R, Zhao Z Y, Merkley K H, Cai J. "Formulation Stabilization and Disaggregation of Bevacizumab, Ranibizumab and Aflibercept in Dilute Solutions." Pharm Res. 2018 Feb. 28; 35(4):78. doi: 10.1007/s11095-018-2368-7). A further contribution to the stability of the liquid drug product, specifically to the at least one active component of the liquid drug product, in particular to a protein, may be due to the fact that degassing the liquid drug product may avoid or at least reduce a formation of aggregates of polysorbate, which may be present in the liquid drug product.

Moreover, it may be possible that the proposed methods and device may reduce a time span necessary for filling a number of containers, such as a batch or a lot, with a liquid drug product, specifically with a degassed liquid drug product, or a time span necessary for filling a certain volume of degassed drug product into containers. This may be due to the fact that the proposed methods and devices may render redundant lengthy degassing steps, in particular degassing steps that cannot be carried out in an in-line fashion but that have to be carried out as separate, non-continuous steps taking place in addition to the filling process. Thus, the proposed methods and device may be less time-consuming than methods and devices of similar kind known in the art.

Summarizing and without excluding further possible embodiments, the following embodiments may be envisaged:

Embodiment 1: A drug product filling device for filling at least one drug product into containers, comprising:
  a) at least one drug product preparation device, the drug product preparation device being configured for preparing the liquid drug product;

b) at least one filling station for filling the liquid drug product into the containers, the filling station being fluidically coupled to the drug product preparation device; and c) at least one degassing device, the degassing device being fluidically interposed in between the drug product preparation device and the filling station and the degassing device comprising at least one membrane for at least partially separating off at least one gas from the liquid drug product.

Embodiment 2: The drug product filling device according to the preceding embodiment, wherein the membrane has a thickness of 25 μm to 200 μm, preferably 25 μm to 100 μm, more preferably 40 μm to 70 μm, most preferably of 55 μm.

Embodiment 3: The drug product filling device according to any one of the preceding embodiments, wherein the degassing device is configured for applying a pressure difference over the membrane, with the liquid drug product being in contact with the membrane on a first side and with an opposing second side of the membrane being exposed to a lower pressure than the first side.

Embodiment 4: The drug product filling device according to the preceding embodiment, wherein the pressure difference over the membrane is 0.1 bar to 3.0 bar, preferably 0.6 bar to 1.0 bar, more preferably 0.8 bar.

Embodiment 5: The drug product filling device according to any one of the two preceding embodiments, wherein the degassing device comprises at least one of a vacuum source or a vacuum port for applying a vacuum to the second side.

Embodiment 6: The drug product filling device according to any one of the preceding embodiments, wherein the drug product, in the degassing device, has an absolute pressure of 0.1 bar to 3.0 bar, preferably 0.6 to 1.0 bar, more preferably 0.8 bar.

Embodiment 7: The drug product filling device according to any one of the preceding embodiments, wherein the degassing device comprises at least one hollow fiber membrane module comprising a plurality of hollow fibers, wherein the hollow fibers are at least partially formed by the membrane.

Embodiment 8: The drug product filling device according to the preceding embodiment, wherein the hollow fibers form fiber bundles.

Embodiment 9: The drug product filling device according to the preceding embodiment, wherein the fiber bundles, on both ends, are embedded in a sealing.

Embodiment 10: The drug product filling device according to any one of the two preceding embodiments, wherein ends of the fiber bundles are connected to connection ports.

Embodiment 11: The drug product filling device according to any one of the four preceding embodiments, wherein the hollow fiber membrane module comprises at least one housing, the housing having the hollow fibers disposed therein.

Embodiment 12: The drug product filling device according to the preceding embodiment, wherein the hollow fiber membrane module comprises at least one fiber entry port connected to a first end of the hollow fibers, at least one fiber exit port connected to a second end of the hollow fibers, and at least one housing entry port and at least one housing exit port, both the housing entry port and the housing exit port being connected to at least one inner space inside the housing between the hollow fibers and a wall of the housing.

Embodiment 13: The drug product filling device according to the preceding embodiment, wherein the hollow fiber membrane module is fluidically interposed in between the drug product preparation device and the filling station in a way selected from the group consisting of:

i) the fiber entry port is directly or indirectly fluidically connected to the drug product preparation device, and the fiber exit port is directly or indirectly fluidically connected to the filling station; or ii) the housing entry port is directly or indirectly fluidically connected to the drug product preparation device, and the housing exit port is directly or indirectly fluidically connected to the filling station.

Embodiment 14: The drug product filling device according to the preceding embodiment, wherein option i) is selected, wherein one or both of the housing entry port and the housing exit port are connected to a suction device, specifically for applying a vacuum to the inner space.

Embodiment 15: The drug product filling device according to any one of the two preceding embodiments, wherein option ii) is chosen, wherein one or both of the fiber entry port and the fiber exit port are connected to a suction device, specifically for applying a vacuum to the inside of the hollow fibers.

Embodiment 16: The drug product filling device according to any one of the preceding embodiments, wherein the membrane comprises at least one material selected from the group consisting of: polydimethylsiloxane (PDMS); cellulose acetate (CA), polysulfone (PS), polyether sulfone (PES), polyacrilonitrile (PAN), polyvinylidiene fluoride (PVDF), poylpropylene (PP), polyethylene (PE), polyvinyl chloride (PVC), polytetrafluoroethylene (PTFE) and silicone, preferably the membrane comprises silicone.

Embodiment 17: The drug product filling device according to any one of the preceding embodiments, wherein the degassing device has at least one entry port connected to the drug product preparation device and at least one exit port connected to the filling station.

Embodiment 18: The drug product filling device according to any one of the preceding embodiments, wherein the degassing device is interposed in between the drug product preparation device and the filling station in an in-line fashion.

Embodiment 19: The drug product filling device according to any one of the preceding embodiments, further comprising at least one in-line filtering device fluidically interposed in between the drug product preparation device and the filling station.

Embodiment 20: The drug product filling device according to the preceding embodiment, wherein the in-line filtering device comprises a sterile filter and optionally a prefilter for reducing the bioburden.

Embodiment 21: The drug product filling device according to any one of the preceding embodiments, wherein the degassing device is at least partially sterilizable.

Embodiment 22: The drug product filling device according to any one of the preceding embodiments, further comprising at least one transfer system configured for transferring the drug product from the drug product preparation device to the filling station wherein the transfer system has at least one of: a gas supply; a pump.

Embodiment 23: The drug product filling device according to the preceding embodiment, wherein a pressure for transferring the drug product from the drug product preparation device to the filling station is 0.8 bar to 1.0 bar.

Embodiment 24: The drug product filling device according to any one of the preceding embodiments, wherein the filling station further comprises at least one inspection device for optically inspecting the containers after filling with the liquid drug product.

Embodiment 25: The drug product filling device according to the preceding embodiment, wherein the filling station further comprises at least one selection device having at least one controller for automatically recognizing defective containers and for automatically removing defective containers.

Embodiment 26: The drug product filling device according to any one of the two preceding embodiments, wherein the inspection device comprises at least one camera and at least one image recognition device.

Embodiment 27: The drug product filling device according to any one of the preceding embodiments, wherein the filling station further comprises at least one closing station for closing the containers by at least one of: stopper; a cap, particularly a Plascap®; a sealing.

Embodiment 28: The drug product filling device according to the preceding embodiment, wherein the closing station further comprises at least one crimping station for fixation of at least one of: the stopper, the cap, particularly the Plascap®, the seal; e.g., by crimping.

Embodiment 29: The drug product filling device according to any one of the preceding embodiments, wherein the drug product preparation device is configured for preparing the liquid drug product from at least two components.

Embodiment 30: The drug product filling device according to any one of the preceding embodiments, wherein the drug product preparation device comprises at least one mixing vessel for mixing at least two components of the drug product.

Embodiment 31: The drug product filling device according to the preceding embodiment, wherein the mixing vessel comprises at least one stirring device for stirring the drug product.

Embodiment 32: The drug product filling device according to any one of the preceding embodiments, wherein the drug product preparation device comprises at least one of: a storage vessel; a transport vessel; wherein the storage vessel and/or the transport vessel is fluidically connected to the filling station.

Embodiment 33: The drug product filling device according to the preceding embodiment, wherein the storage vessel comprises at least one tempering device for one or both of cooling or heating the drug product.

Embodiment 34: The drug product filling device according to any one of the two preceding embodiments, wherein the storage vessel comprises at least one gas supply for supplying at least one shielding gas into the storage vessel and for storing the drug product under the shielding gas.

Embodiment 35: The drug product filling device according to the preceding embodiment, wherein the gas supply comprises at least one nitrogen supply.

Embodiment 36: The drug product filling device according to any one of the preceding claims, wherein the drug product has a viscosity from 0.2 mPa s to 30 mPa s, preferably from 1 mPa s to 20 mPa s, more preferably 1 mPa s to 5 mPa s, most preferably 1 mPa s to 1.5 mPa s.

Embodiment 37: The drug product filling device according to any of the preceding embodiments, wherein the at least one membrane has a contact area for being in contact with the drug product, wherein a size of the contact area is 10 cm$^2$ to 5 m$^2$, preferably 0.5 m$^2$ to 1.5 m$^2$, more preferably the size of the contact area is 1 m$^2$.

Embodiment 38: The drug product filling device according to any of the preceding claims, wherein the drug product filling device is configured for conducting the drug product through the degassing device at a rate of 5 L/h to 150 L/h, preferably of 60 L/h to 100 L/h, more preferably at a rate of 70 L/h to 90 L/h.

Embodiment 39: The drug product filling device according to any of the preceding embodiment, wherein the drug product has a temperature of 0° C. to 25° C.

Embodiment 40: The drug product filling device according to any of the preceding embodiments, wherein the drug product filling device further comprises a coupling bow having at least one first coupling access and at least one second coupling access, wherein the degassing device is directly or indirectly fluidically connectable to the drug product preparation device via the first coupling access, wherein the degassing device is directly or indirectly fluidically connectable to the filling station via the second coupling access.

Embodiment 41: The drug product filling device according to the preceding embodiment, wherein the coupling bow further comprises at least one holder for mounting the degassing device.

Embodiment 42: A method of filling at least one drug product into containers, comprising:
A) providing at least one drug product filling device configured for filling at least one liquid drug product into containers, wherein providing the drug product filling device comprises:
  providing at least one drug product preparation device, the drug product preparation device being configured for preparing the liquid drug product;
  providing at least one filling station for filling the liquid drug product into the containers, the filling station being fluidically coupled to the drug product preparation device;
  providing at least one degassing device being fluidically interposed in between the drug product preparation device and the filling station and the degassing device comprising at least one membrane for separating off at least one gas from the liquid drug product;
B) conducting the drug product from the drug product preparation device to the filling station, wherein the drug product is at least partially degassed upon passing through the degassing device; and
C) filling the at least partially degassed drug product into the containers by means of the filling station.

Embodiment 43: The method according to the preceding embodiment, step B) further comprising:
applying a pressure difference over the membrane using the degassing device, with the liquid drug product being in contact with the membrane on a first side and with an opposing second side of the membrane being exposed to a lower pressure than the first side.

Embodiment 44: The method according to the preceding embodiment, wherein the degassing device is configured for applying the pressure difference over the membrane by comprising at least one of a vacuum source or a vacuum port for applying a vacuum to the second side.

Embodiment 45: The method according to any one of the preceding method embodiments, wherein the degassing device comprises at least one hollow fiber membrane module comprising a plurality of hollow fibers, wherein the hollow fibers are at least partially formed by the membrane.

Embodiment 46: The method according to the preceding method embodiment, wherein the hollow fibers form fiber bundles.

Embodiment 47: The method according to any one of the preceding method embodiment, step B) further comprising:

conducting the drug product from the drug product preparation device to the filling station by at least sectionally using a stream of transport gas.

Embodiment 48: The method according to the preceding embodiment, wherein the transport gas is nitrogen.

Embodiment 49: The method according to any one of the preceding method embodiments, wherein a drug product filling device according to any of the preceding claims concerning a drug product filling device is used.

Embodiment 50: The method according to any one of the preceding method embodiments, wherein the accuracy of the filling weight of the liquid drug product in the container is increased.

Embodiment 51: The method according to any one of the preceding method embodiments, wherein the stability of at least one oxygen-sensitive active pharmaceutical ingredient in the liquid drug product is increased.

Embodiment 52: The method according to any one of the preceding method claims, wherein polysorbate aggregate formation in the liquid drug product is reduced.

Embodiment 53: A method of increasing the accuracy of the filling weight of a liquid drug product in a container, the method comprising:
  I. preparing the at least one liquid drug product;
  II. degassing the liquid drug product by at least partially separating off at least one gas from the liquid drug product by using a degassing device, the degassing device comprising at least one membrane;
  III. filling the degassed liquid drug product into the container.

Embodiment 54: The method according to the preceding embodiment, wherein the method comprises using the degassing device as described in any one of the preceding embodiments referring to a drug product filling device.

Embodiment 55: The method according to any one of the two preceding embodiments, wherein the method comprises using the drug product filling device as described in any one of the preceding embodiments referring to a drug product filling device.

Embodiment 56: A method of increasing the stability of at least one oxygen-sensitive active pharmaceutical ingredient, in particular a protein, in a liquid drug product, specifically a liquid drug product in a container, the method comprising:
  α. preparing the at least one liquid drug product, the liquid drug product comprising at least one oxygen-sensitive active pharmaceutical ingredient, in particular a protein; and
  β. degassing the liquid drug product by at least partially separating off at least one gas from the liquid drug product by using a degassing device, the degassing device comprising at least one membrane.

Embodiment 57: The method according to the preceding embodiment, wherein the method comprises using the degassing device as described in any one of the preceding embodiments referring to a drug product filling device.

Embodiment 58: The method according to any one of the two preceding embodiments, wherein the method comprises using the drug product filling device according to any one of the preceding embodiments referring to a drug product filling device.

Embodiment 59: The method according to any one of the three preceding embodiments, further comprising:
  γ. filling the degassed liquid drug product into at least one container.

Embodiment 60: A method of reducing polysorbate aggregate formation in a liquid drug product, specifically a liquid drug product in a container, the method comprising:
  X. preparing the at least one liquid drug product, the liquid drug product comprising at least one oxygen-sensitive active pharmaceutical ingredient, in particular a protein, and at least one polysorbate; and
  Y. degassing the liquid drug product by at least partially separating off at least one gas from the liquid drug product by using a degassing device, the degassing device comprising at least one membrane.

Embodiment 61: The method according to the preceding embodiment, wherein the method comprises using the degassing device as described in any one of the preceding embodiments referring to a drug product filling device.

Embodiment 62: The method according to any one of the two preceding embodiments, wherein the method comprises using the drug product filling device according to any one of the preceding embodiments referring to a drug product filling device.

Embodiment 63: The method according to any one of the three preceding embodiments, further comprising:
  Z. filling the degassed liquid drug product into at least one container.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
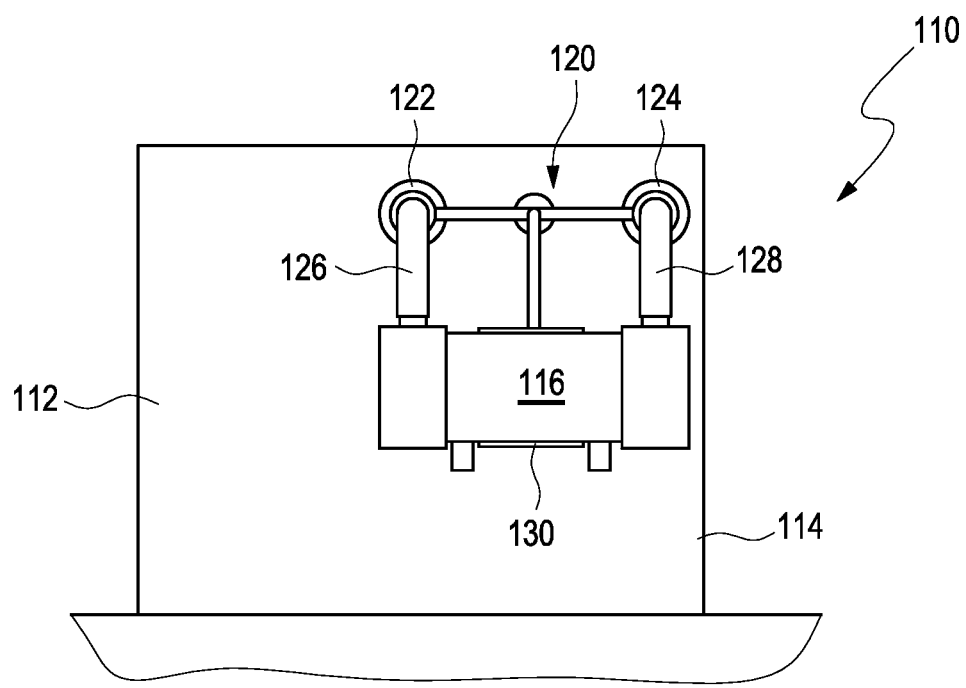
FIGS. 1A and 1B show a sectional view of a drug product filling device comprising a coupling bow (1A) and a degassing device inserted into a holder of the coupling bow (1B)
Figure 1:
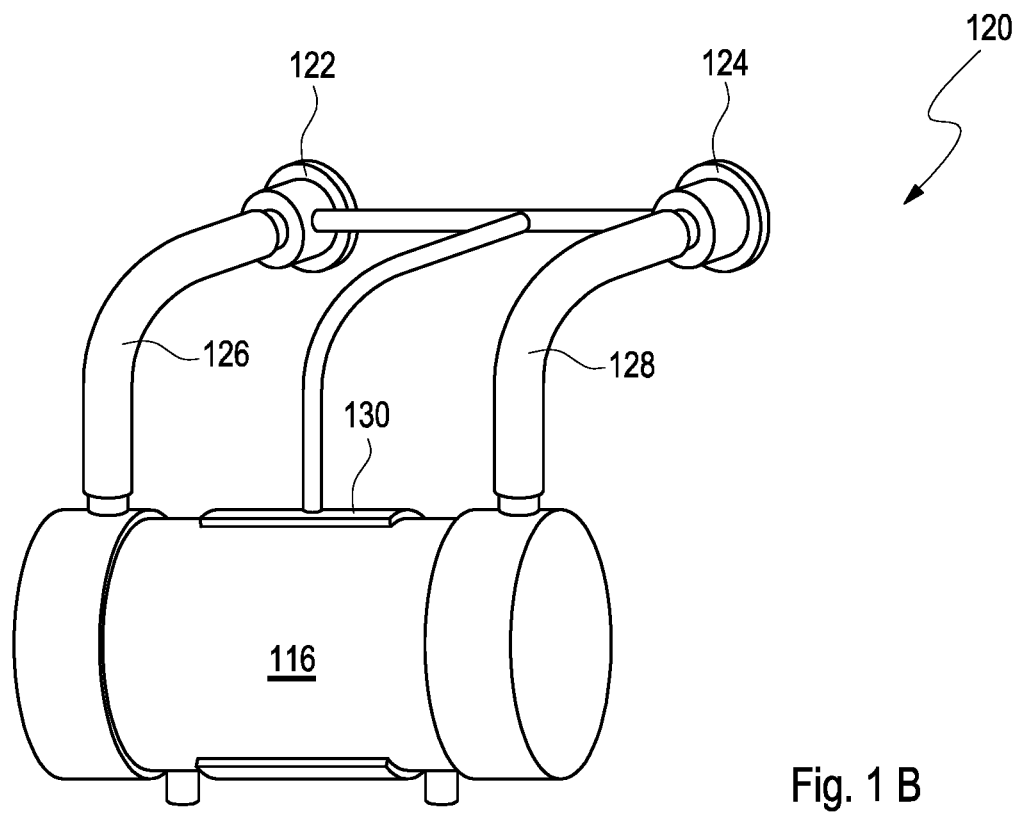

FIG. 1A shows a sectional view of a drug product filling device 110 configured for filling at least one liquid drug product into containers. The drug product filling device 110 comprises at least one drug product preparation device (drug product preparer) 112, the drug product preparation device 112 being configured for preparing the liquid drug product. The drug product filling device 110 further comprises at least one filling station 114 for filling the liquid drug product into the containers, the filling station 114 being fluidically coupled to the drug product preparation device 112 as also depicted in FIG. 1A. As further illustrated in FIG. 1A, the drug product filling 114 device furthermore comprises at least one degassing device (degasser) 116, the degassing device 116 being fluidically interposed in between the drug product preparation device 112 and the filling station 114. The degassing device 116 comprises at least one membrane 118 for at least partially separating off at least one gas from the liquid drug product. As also shown in FIG. 1A, the drug product filling 110 device may further comprise a coupling bow 120 having at least one first coupling access 122 and at least one second coupling access 124, wherein the degassing device 116 may be fluidically connectable to the drug product preparation device 112 via the first coupling access 122, wherein the degassing device 116 may be fluidically connectable to the filling station 114 via the second coupling access 124.

FIG. 1B shows a detailed view of the coupling bow 120. As can be seen, the degassing device may be fluidically connected to the first coupling access 122 by a first flexible tube 126 and the degassing device may be fluidically connected to the second coupling access 124 by a second flexible tube 128. Thus, the degassing device 116 may be indirectly fluidically coupled to the drug product preparation device 112 and the filling station 114, wherein the indirect fluidic connection with the drug product preparation device 112 may be established at least by the first coupling access 122 and the first flexible tube 126 and the indirect fluidic connection with the filling station 114 may be established at least by the second coupling access 124 and the second flexible tube 128. The coupling bow 120 may further comprise at least one holder 130 for mounting the degassing device 116. Additionally or alternatively, the drug product filling device 110, in particular the drug product preparation device 112 and/or the filling station 114, may comprise the holder 130 for mounting the degassing device 116 (not shown in the Figures). In particular the holder 130 may be configured to removably receive the degassing device 116, as, e.g., shown in FIG. 1B. In particular, the degassing device may be or may comprise a PermSelect® Silicone Membrane Module as available from MedArray Inc., Ann Arbor, MI 48108, U.S.A., such as the hollow fiber membrane module PDMSXA-2500 and/or the hollow fiber membrane module PSMSXA-1.0.

Figure 2:
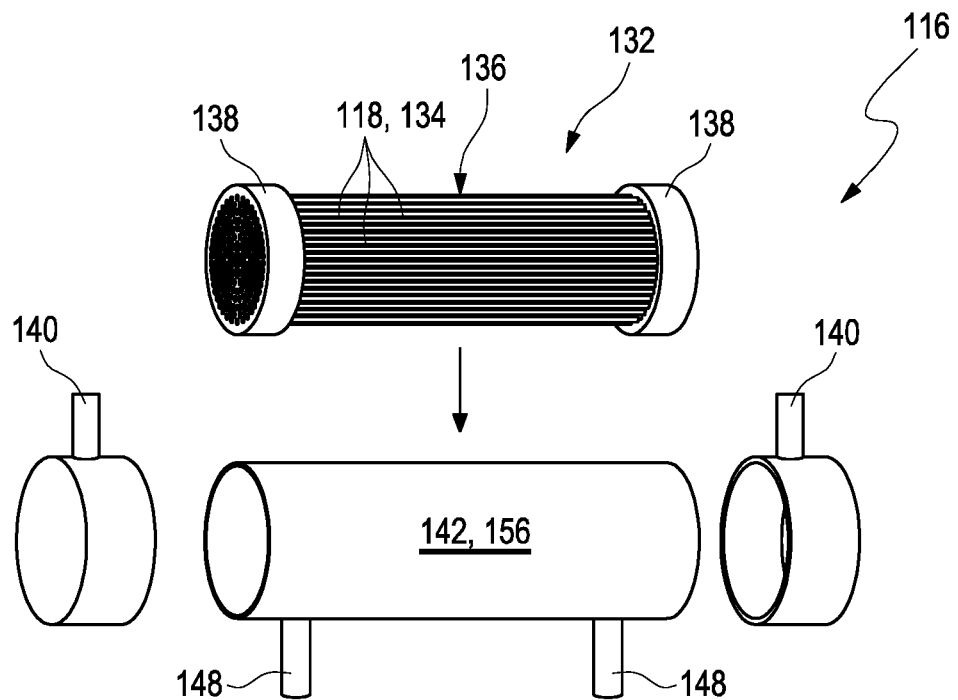
FIGS. 2A and 2B show an exploded view of the degassing device (2A) and a detailed view of a hollow fiber of a fiber bundle comprised by the degassing device.
Figure 2:
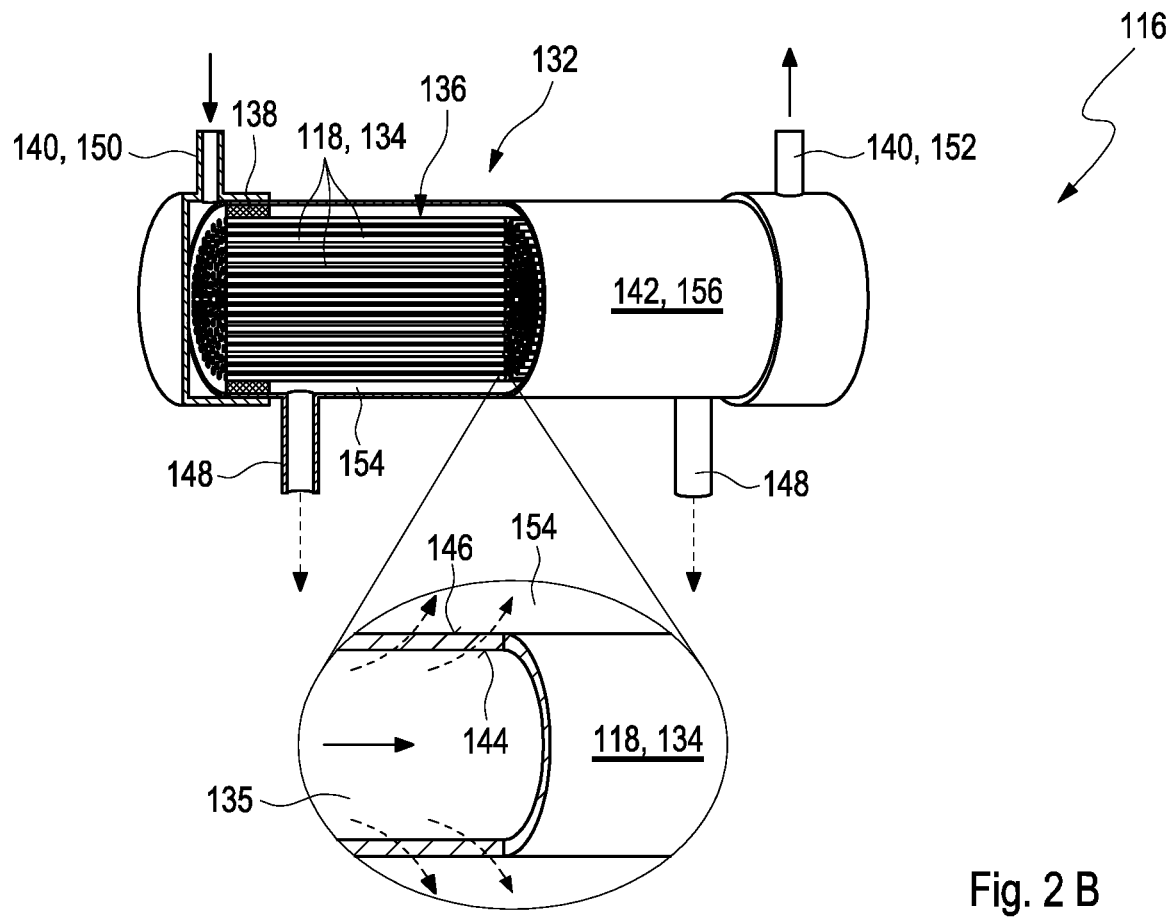

FIG. 2A shows an exploded view of the degassing device 116. The degassing device 116 comprises at least one membrane 118 for separating off gases from the liquid drug product. Specifically, the membrane may comprise at least one material selected from the group consisting of: polydimethylsiloxane (PDMS); cellulose acetate (CA), polysulfone (PS), polyether sulfone (PES), polyacrilonitrile (PAN), polyvinylidiene fluoride (PVDF), poylpropylene (PP), polyethylene (PE), polyvinyl chloride (PVC), polytetrafluoroethylene (PTFE) and silicone, preferably the membrane comprises silicone. In particular, the membrane may have a thickness of 25 µm to 100 µm, preferably 40 µm to 70 µm, more preferably of 55 µm. As depicted in FIG. 2A, the degassing device 116 may specifically comprise at least one hollow fiber membrane module 132 comprising a plurality of hollow fibers 134, wherein the hollow fibers 134 are at least partially formed by the membrane 118. Specifically, the hollow fibers 134 may have an inner diameter and an outer diameter, wherein the inner diameter may have a value of 50 µm to 800 µm, preferably of 150 µm to 250 µm, more preferably a value of 190 µm, and wherein the outer diameter may have a value of 75 µm to 900 µm, preferably of 150 µm to 450 µm, more preferably a value of 300 µm. In particular, the thickness of the membrane may be 55 µm, the inner diameter of the hollow fiber 134 may be 190 µm and the outer diameter of the hollow fiber 134 may be 300 µm. The hollow fiber 134 may at least partially define or comprises an interior space or lumen 135. In particular, the interior space or lumen 135 of the hollow fiber 134 may also be referred to as an inside of the hollow fiber 134. Further, the plurality of hollow fibers 134 of the hollow fiber membrane module 132 may comprise a number of 30 hollow fibers 134 to 30000 hollow fibers 134. The number of the hollow fibers 134 of the hollow fiber membrane module 132 may in particular depend on a size of the hollow fiber membrane module 132, in particular on an overall membrane 118 area, i.e., on the sum of membrane 118 areas of all hollow fibers 134 in the hollow fiber membrane module 132, and/or on a cross sectional area of the hollow fiber membrane module 132, wherein the cross sectional area may be perpendicular to a main direction of extension, in particular to a length, of the hollow fiber membrane module 132.

As an example, the fiber count per unit membrane 118 area may be in the range of 1.0 to 4.0 fibers/cm$^2$, e.g., 1 to 3 fibers/cm$^2$, preferably 1 to 1.5 fibers/cm$^2$, more preferably 1.26 to 1.42 fibers/cm$^2$. Additionally or alternatively, the number of hollow fibers 1324, specifically a fiber count, per cross sectional area unit of the hollow fiber membrane module 132 may be 20 cm$^{-2}$ to 800 cm$^{-2}$, such as 40 cm$^{-2}$ to 500 cm$^{-2}$, e.g., 42 cm$^{-2}$ to 483 cm$^{-2}$.

In particular, the number of hollow fibers 134 per cross sectional area unit of the hollow fiber membrane module 132 may be from 20 cm$^{-2}$ to 800 cm$^{-2}$, preferably form 40 cm$^{-2}$ to 570 cm$^{-2}$.

Furthermore, the hollow fibers 134 may have a length of 10 cm to 16 cm, preferably of 10 cm to 15 cm, more preferably of 10 cm to 12 cm. Further the hollow fiber membrane module 132 may have a length of 10 cm to 16 cm, preferably of 10 cm to 16 cm, more preferably of 11 cm to 15 cm, most preferably of 14 cm. FIG. 2A further illustrates that the hollow fibers 134 may, specifically, form fiber bundles 136. In particular, the fiber bundles 136, on both ends, may be embedded in a sealing 138. Further, the ends of the fiber bundles 136 may be connected to connection ports 140 as illustrated in FIG. 2A. The hollow fiber membrane module 132 may further comprise at least one housing 142, the housing 142 having the hollow fibers 134 disposed therein. Furthermore, the hollow fiber membrane module 132 may comprise at least one fiber entry port connected to a first end of the hollow fibers, at least one fiber exit port connected to a second end of the hollow fibers, and at least one housing entry port and at least one housing exit port, both the housing entry port and the housing exit port being connected to at least one inner space inside the housing between the hollow fibers and a wall of the housing.

A fluid, in particular a gas or a liquid, may be introduced into the fibers via the fiber entry port. In particular, in the case of the fluid being a gas, the fiber entry port may also be used as a fiber exit port. Thus, as described further below, a vacuum may be applied to the inside of the hollow fiber by connecting one or both of the fiber entry port and the fiber exit port to a suction device.

A fluid, in particular a gas or a liquid, may be introduced into the inner space of the housing via the fiber entry port. In particular, in the case of the fluid being a gas, the housing entry port may also be used as a housing exit port. Thus, as described further below, a vacuum may be applied to the inner space by connecting one or both of the housing entry port and the housing exit port to a suction device.

A fluid, in particular a gas or a liquid, contained in inner space of the housing may be exported from the inner space of the housing via the housing exit port.

FIG. 2B illustrates a detailed view of the hollow fiber 134 of the fiber bundle 136 comprised by the degassing device 116. The degassing device 116 may particularly be configured for applying a pressure difference over the membrane 118, with the liquid drug product being in contact with the membrane on a first side 144 and with an opposing second side 146 of the membrane 118 being exposed to a lower pressure than the first side 144. Thus, the pressure difference may be the difference between the magnitude of the pressure on the first side 144 and the magnitude of the pressure on the second side 146. Specifically, the pressure difference over the membrane 118 may be 0.1 bar to 3.0 bar, preferably 0.6 bar to 1.0 bar, more preferably 0.8 bar. Further, the degassing device 116 may comprise at least one of a vacuum source (not shown in the Figures) or a vacuum port 148 for applying a vacuum to the second side 146. Specifically, the vacuum source may comprise at last one pump. In particular, an absolute value of the vacuum applied to the second side 146 may be 0.010 bar to 0.900 bar, preferably, 0.010 to 0.020 bar, more preferably 0.015 bar. In FIG. 2B, solid arrows illustrate a direction of motion of the liquid drug product, which may enter the degassing device 116 via a fiber entry port 150 to be led through the hollow fibers 134 for being at least partially degassed. As also indicated by the solid arrow, the liquid drug product may then leave the hollow fiber membrane module 132 via a fiber exit port 152 being at least partially degassed. Thus, the connection port 140 connected to one end of the fiber bundle 136 may be implemented as the fiber entry port 150 and the connection port 140 at the other end of the fiber bundle 136 may be implemented as a fiber exit port 152. Further, the fiber entry port 150 may be connected to the drug product preparation device and the fiber exit port may be connected to the filling station (not shown in FIG. 2B). Dashed arrows illustrate a direction of motion of the at least one gas which is separated off from the liquid drug product by means of the degassing device 116. Specifically, the drug product, in the degassing device 116, may have an absolute pressure of 0.1 bar to 3.0 bar, preferably 0.6 bar to 1.0 bar, more preferably 0.8 bar. Furthermore, the hollow fiber membrane module 132 may comprise at least one housing entry port and at least one housing exit port, both the housing entry port and the housing exit port being connected to at least one inner space 154 inside the housing 142 between the hollow fibers 134 and a wall 156 of the housing 142.

Figure 3:
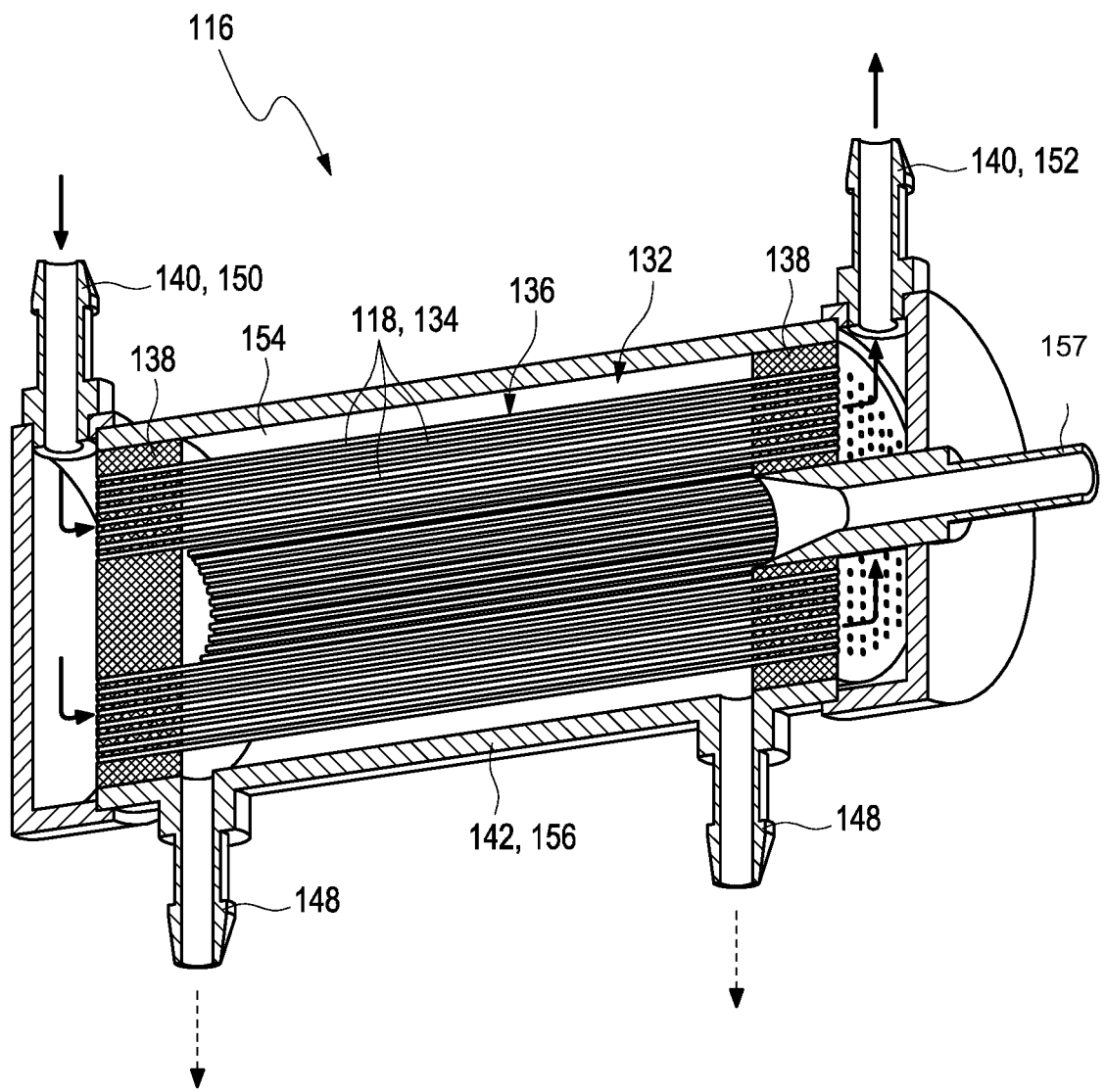
FIG. 3 shows a further view of the degassing device.

FIG. 3 illustrates a further view of the degassing device 116. The degassing device 116 is fluidically interposed in between the drug product preparation device 112 and the filling station 114. Specifically, the hollow fiber membrane module 132 may be fluidically interposed in between the drug product preparation device 112 and the filling station 114 in a way selected from the group consisting of:
  i) the fiber entry port 150 may be directly or indirectly fluidically connected to the drug product preparation device 112, and the fiber exit port 152 may be directly or indirectly fluidically connected to the filling station 114; or
  ii) the housing entry port may be directly or indirectly fluidically connected to the drug product preparation device, and the housing exit port may be directly or indirectly fluidically connected to the filling station (not shown in the Figures).

FIG. 3 shows a sectional view of option i) with particular attention on the degassing device 116. As illustrated in FIGS. 3 and 2B, the connection port 140 connected to one end of the fiber bundle 136 may be implemented as the fiber entry port 150 and the connection port 140 at the other end of the fiber bundle 136 may be implemented as a fiber exit port 152. Again, dashed arrows illustrate a direction of motion of the at least one gas which is separated off from the liquid drug product by means of the degassing device 116. In the case as depicted in FIG. 3, the liquid drug product may flow through the lumen 135 of the hollow fibers 134 and the gas separated off from the liquid drug product may be discarded via the vacuum ports 148. If option ii) is chosen (not shown in the Figures), the liquid drug product may flow through the inner space 154 of the housing 142. Thus, in the case of option ii), the vacuum ports 148 as shown in FIG. 3 may be used as housing entry port and housing exit port, respectively, and the connection ports 140 may be used as vacuum ports 148. A further opening 157 may remain closed in both option i) and option ii).

Figure 4:
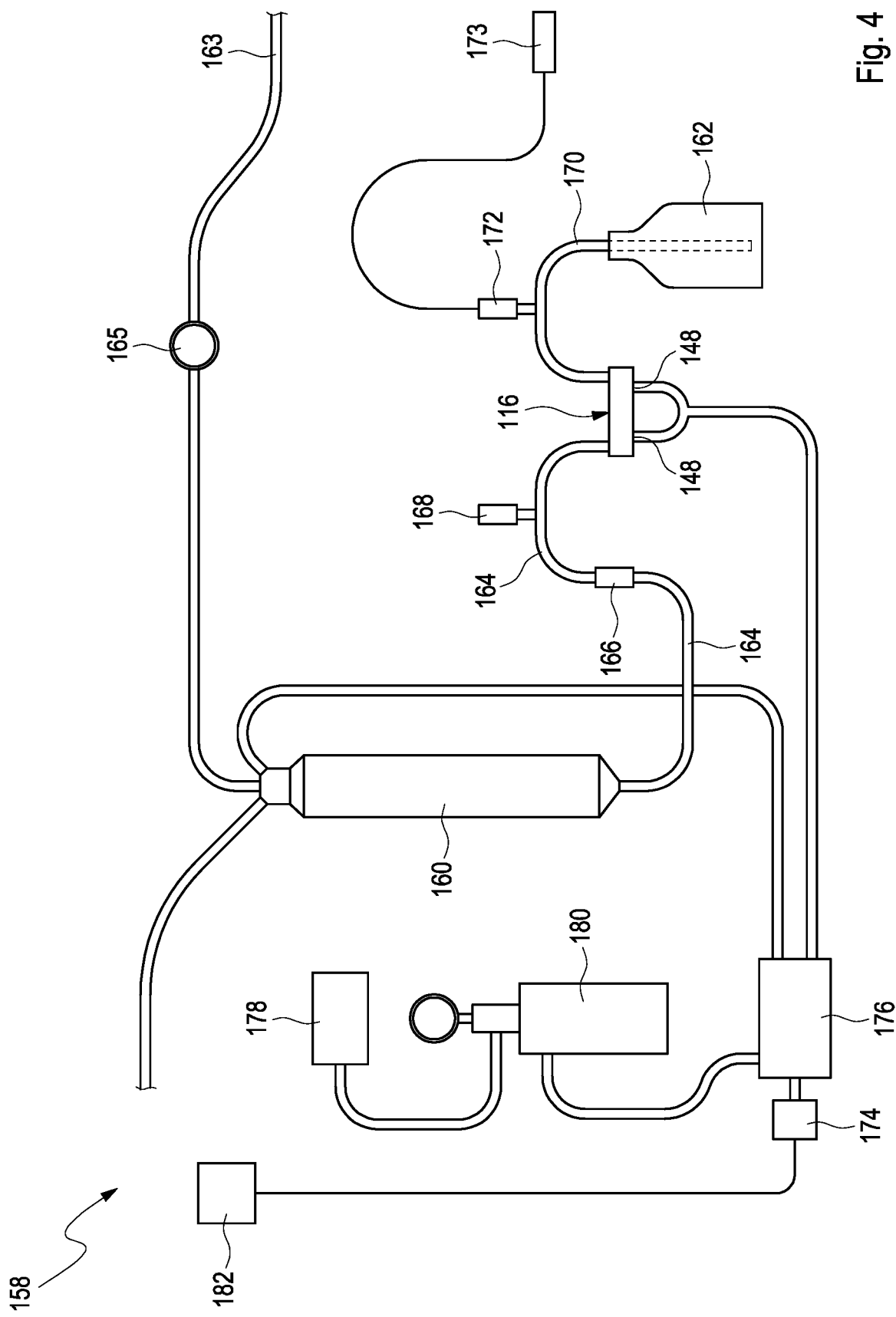
FIG. 4 shows an experimental setup for testing a function of separating off oxygen from the liquid drug product by the degassing device.

FIG. 4 shows an experimental setup 158 for testing a function of separating off oxygen as an exemplary gas from the liquid drug product by the degassing device 116. The experimental setup 158 comprises the degassing device 116, which is fluidically interposed in between a reservoir 160 of the liquid drug product and a collecting receptacle 162. Nitrogen gas is guided through at least one nitrogen supply tube 163 to the reservoir to generate a pressure required to deliver the drug product to the degassing device 116 via at least one delivery tube 164. The pressure of the nitrogen in the nitrogen supply tube 163 is adjustable by a pressure reducer 165. A flow meter 166 determines a volume flow per time unit of the drug product through the delivery tube 164. A pressure transmitter 168 monitors the pressure in the delivery tube 164. The degassing device 116 is further connected to the collection receptacle 162 via at least one receiving tube 170, which guides the at least partially degassed drug product to the receptacle 162. An oxygen sensor 172 connected to an oxygen meter 173 determines an oxygen content of the at least partially degassed liquid drug product in the receiving tube 170. A vacuum is applied by means of at least one vacuum pump 174 in conjunction with at least one peristaltic pump 176 such that the second side 146 of the membrane 118 is exposed to a lower pressure than the first side 144 of the membrane 118. The experimental setup 158 further comprises a vacuum controller 178, a vacuum reservoir 180 and a power supply 182. The experimental setup 158 may comprise further elements that may not be shown in FIG. 4 and/or that may not be mentioned or described.

Further experimental setups 158, which are not shown in the Figures, are used to investigate and/or evaluate further aspects of the drug product filling device. In particular, an effect of the degassing device on a concentration of at least one active component of the liquid drug product may be investigated, e.g., by using a cold trap that may trap collected water.

Figure 5:
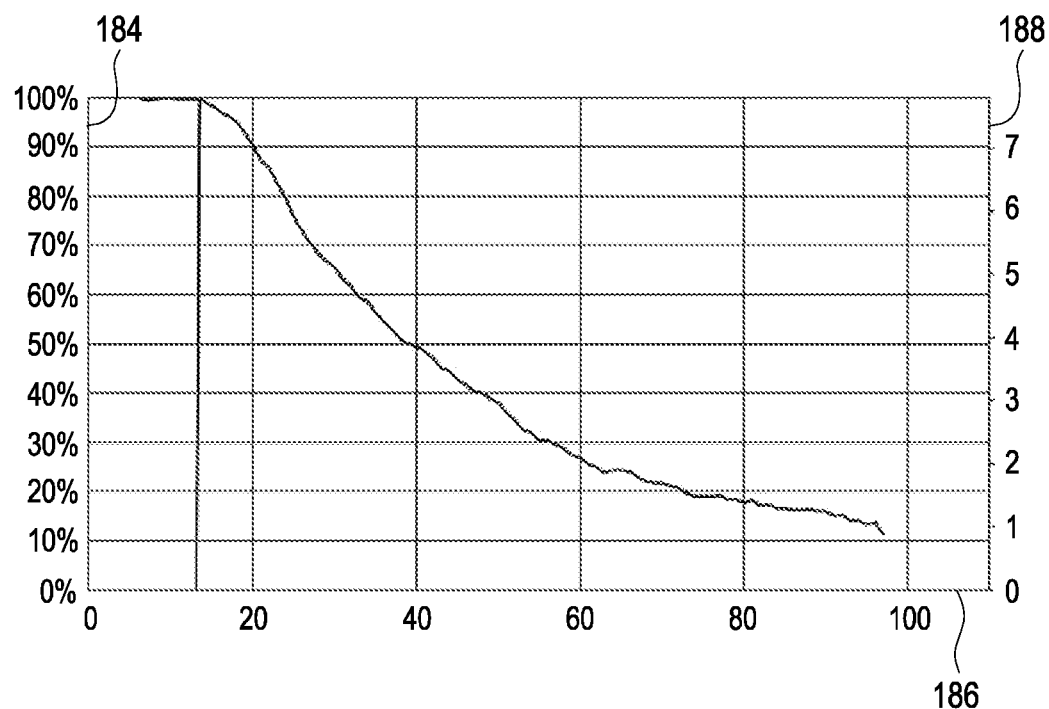
FIGS. 5A, 5B, 5C and 5D show measuring diagrams illustrating an oxygen content in the drug product as a function of time for different flow rates of the drug product (5A, 5B and 5C) and illustrating an oxygen separation efficiency as a function of the flow rate of the drug product (5D)
Figure 5:
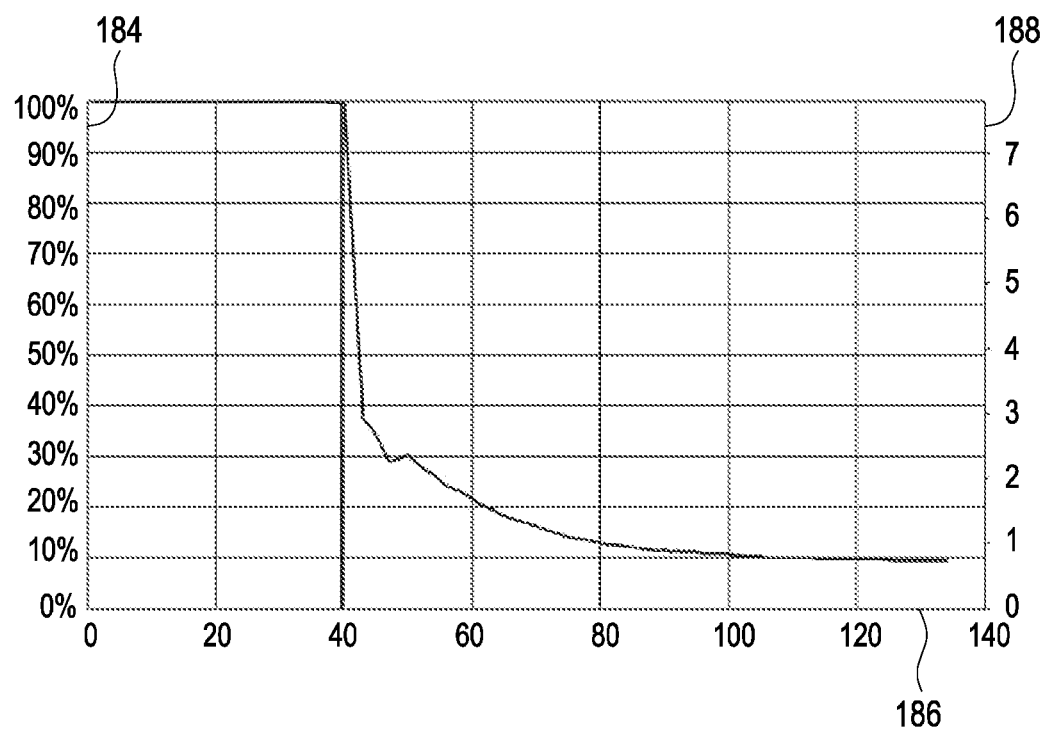
Figure 5:
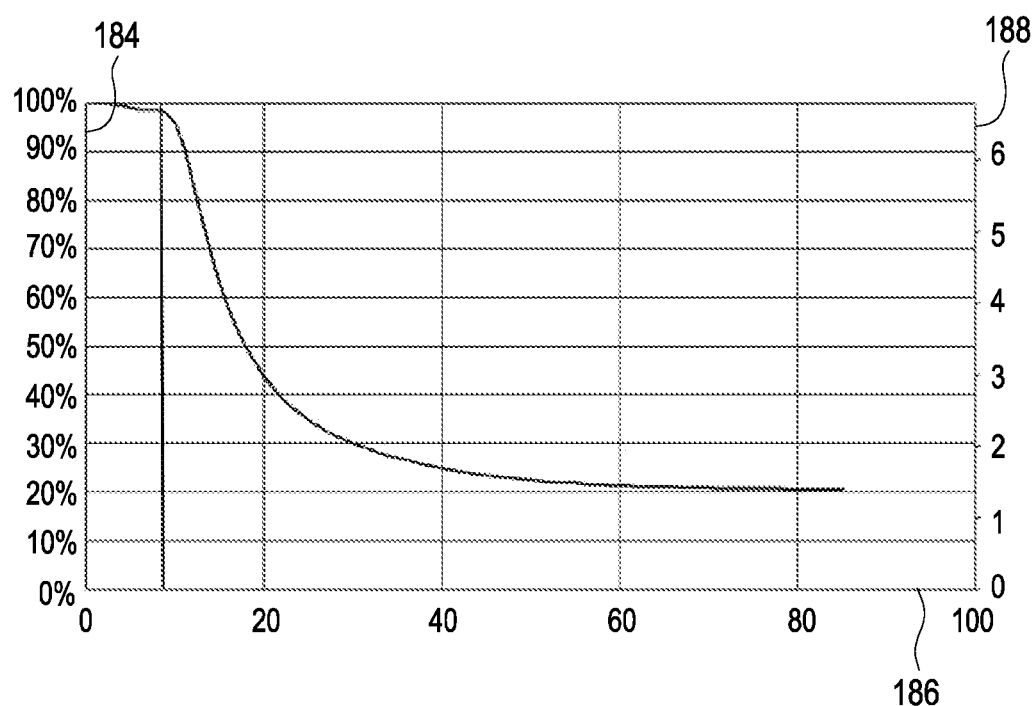
Figure 5:
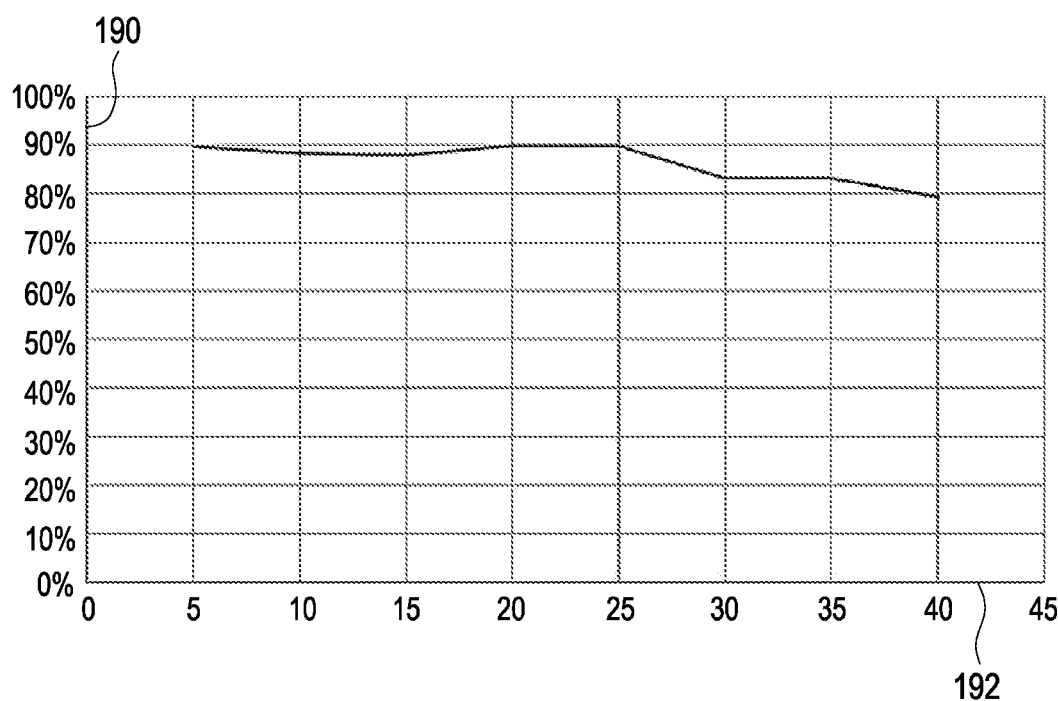

FIGS. 5A, 5B and 5C show measuring diagrams plotting the oxygen content in percent 184 of the liquid drug product on the left x-axis as a function of time in seconds 186. The start value of the oxygen content, therein, is arbitrarily set to be 100%. The point in time at which the vacuum is applied is demarcated by a straight vertical line. The x-axis on the right hand side indicates the oxygen content in mg/L 188. FIGS. 5A, 5B and 5C all refer to an experimental set-up with a vacuum of 100 mbar applied to the second side of the membrane 118 and differing flow rates of 10 L/h (5A), 20 L/h (5B) and 40 L/h (5C). The measuring diagrams in FIGS. 5A, 5B and 5C show a decrease in the oxygen content comprised by the liquid drug product as a function of the time for all flow rates. FIG. 5D illustrates an oxygen separation efficiency 190 as a function of the volume flow in L/h of the drug product showing oxygen separation efficiencies of approximately 80% to 90% depending on the volume flow.

In a second aspect of this disclosure a method of filling at least one drug product into containers is disclosed. The method comprises the steps disclosed in the following. The steps may specifically be performed in the given order. Still, a different order is possible. The method may comprise additional steps which are not mentioned. It is further possible to perform one or more of the method steps repeatedly. Further, two or more of the method steps may be performed in a timely overlapping fashion or simultaneously.

Figure 6:
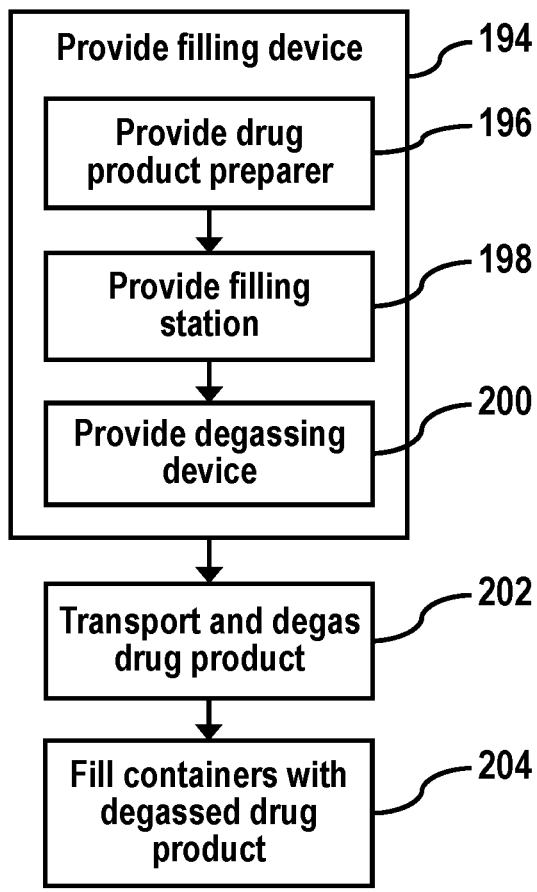
FIG. 6 shows a method of filling a drug product into containers.

As illustrated in FIG. 6, the method comprises in a first step A) (method step 194) providing at least one drug product filling device 110 configured for filling at least one drug product into containers, wherein providing the drug product filling device comprises at least the substeps of providing at least one drug product preparation device 112, the drug product preparation device 112 being configured for preparing a liquid drug product (substep 196), providing at least one filling station 114 for filling the liquid drug product into the containers, the filling station being fluidically coupled to the drug product preparation device 112 (substep 198) and providing at least one degassing device 116 being fluidically interposed in between the drug product preparation device 112 and the filling station 114 and the degassing device 116 comprising at least one membrane 118 for separating off at least one gas from the liquid drug product (substep 200). The method further comprises in second step B (method step 202) conducting the drug product from the drug product preparation device 112 to the filling station 114, wherein the drug product is at least partially degassed upon passing through the degassing device 116. The method further comprises in a third step C) (method step 204) filling the at least partially degassed drug product into the containers by means of the filling station 114.

The method may comprise further steps, which are not shown in the Figures. In particular, step B) (method step 202) of the method may further comprise applying a pressure difference over the membrane 118 using the degassing device, with the liquid drug product being in contact with the membrane on a first side 144 and with an opposing second side 146 of the membrane 118 being exposed to a lower pressure than the first side 144. In particular, the degassing device 116 provided in step A) may be configured for applying the pressure difference over the membrane 118 by comprising at least one of a vacuum source or a vacuum port 148 for applying a vacuum to the second side 146. The degassing device 116 may further comprise at least one hollow fiber membrane module 132 comprising a plurality of hollow fibers 134, wherein the hollow fibers 134 are at least partially formed by the membrane 118. The hollow fibers 134 may form fiber bundles 136. Further, step B) may specifically comprise conducting the drug product from the drug product preparation device 112 to the filling station 114 by at least sectionally using a stream of transport gas and/or a pump. In particular, the transport gas may be nitrogen. Further, the drug product filling device 110 as provided in step A) (method step 194) may specifically be a drug product filling device 110 as described above or as described further below. Still, other embodiments are feasible.

In a third aspect of this disclosure, a method of increasing the accuracy of the filling weight of a liquid drug product in a container is disclosed. The method comprises the steps disclosed in the following. The steps may specifically be performed in the given order. Still, a different order is possible. The method may comprise additional steps which are not mentioned. It is further possible to perform one or more of the method steps repeatedly. Further, two or more of the method steps may be performed in a timely overlapping fashion or simultaneously.

Figure 7:
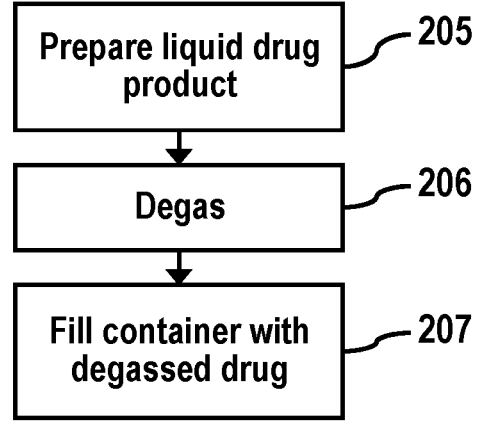
FIG. 7 shows a method of increasing the accuracy of the filling weight of a liquid drug product in a container.

As illustrated in FIG. 7, the method comprises in a first step I. (method step 205) preparing the at least one liquid drug product. The method further comprises in a second step II. (method step 206) degassing the liquid drug product by at least partially separating off at least one gas from the liquid drug product by using a degassing device 116, the degassing device 116 comprising at least one membrane 118. The method further comprises in a third step (method step 207) filling the degassed liquid drug product into the container.

In a fourth aspect of this disclosure, a method of increasing the stability of an oxygen-sensitive active pharmaceutical ingredient, such as a protein, in a liquid drug product, specifically a liquid drug product in a container is disclosed. The method comprises the steps disclosed in the following. The steps may specifically be performed in the given order. Still, a different order is possible. The method may comprise additional steps which are not mentioned. It is further possible to perform one or more of the method steps repeatedly. Further, two or more of the method steps may be performed in a timely overlapping fashion or simultaneously.

Figure 8:
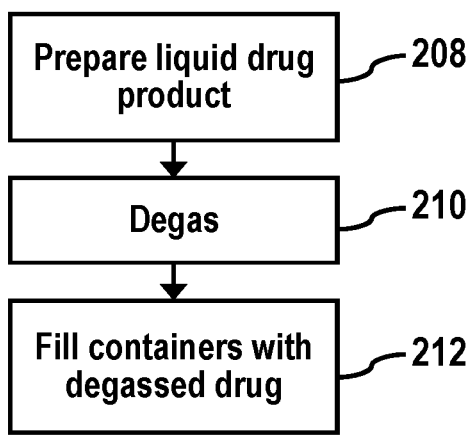
FIG. 8 shows a method of increasing the stability of an oxygen-sensitive active pharmaceutical ingredient in a liquid drug product.

As illustrated in FIG. 8, the method comprises in a first step a. (method step 208) preparing the at least one liquid drug product, the liquid drug product comprising at least one oxygen-sensitive active pharmaceutical ingredient, such as a protein. The method further comprises in a second step β. (method step 210) degassing the liquid drug product by at least partially separating off at least one gas from the liquid drug product by using a degassing device, the degassing device comprising at least one membrane. The method may further comprise in a third step (method step 212) filling the degassed liquid drug product into at least one container. The method may specifically comprise using the degassing device as described above or as described further below. Further, the method may particularly comprise using the drug product filling device as described above or as described further below.

In a fifth aspect of this disclosure, a method of reducing the formation of polysorbate aggregate formation in a liquid drug product, specifically a liquid drug product in a container, is described. The method comprises the steps disclosed in the following. The steps may specifically be performed in the given order. Still, a different order is possible. The method may comprise additional steps which are not mentioned. It is further possible to perform one or more of the method steps repeatedly. Further, two or more of the method steps may be performed in a timely overlapping fashion or simultaneously.

Figure 9:
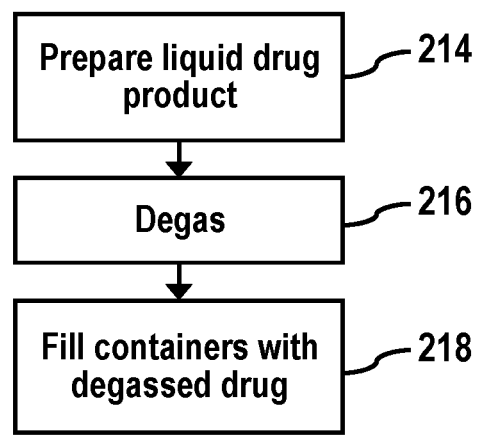
FIG. 9 shows a method of reducing the formation of polysorbate aggregate formation in a liquid drug product.

As illustrated in FIG. 9, the method comprises in a first step (method step 214) preparing the at least one liquid drug product, the liquid drug product comprising at least one oxygen-sensitive active pharmaceutical ingredient, such as a protein, and at least one polysorbate. The method further comprises in a second step (method step 216) degassing the liquid drug product by at least partially separating off at least one gas from the liquid drug product by using a degassing device, the degassing device comprising at least one membrane. The method may further comprise in a third step (method step 218) filling the degassed liquid drug product into at least one container. The method may specifically comprise using the degassing device as described above or as described further below. Further, the method may particularly comprise using the drug product filling device as described above or as described further below.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE SIGNS

- 110 drug product filling device
- 112 drug product preparation device
- 114 filling station
- 116 degassing device
- 118 membrane
- 120 coupling bow
- 122 first coupling access
- 124 second coupling access
- 126 first flexible tube
- 128 second flexible tube
- 130 holder
- 132 hollow fiber membrane module
- 134 hollow fiber
- 135 lumen
- 136 fiber bundle
- 138 sealing
- 140 connection port
- 142 housing
- 144 first side of the membrane
- 146 second side of the membrane
- 148 vacuum port
- 150 fiber entry port
- 152 fiber exit port
- 154 inner space
- 156 wall
- 157 further opening
- 158 experimental setup
- 160 reservoir
- 162 collection receptacle
- 163 nitrogen supply tube
- 164 delivery tube
- 165 pressure reducer
- 166 flow meter
- 168 pressure transmitter
- 170 receiving tube
- 172 oxygen sensor
- 173 oxygen meter
- 174 vacuum pump
- 176 peristaltic pump
- 178 vacuum controller
- 180 vacuum reservoir
- 182 power supply
- 184 oxygen content in percent
- 186 time in seconds
- 188 oxygen content in mg/L
- 190 oxygen separation efficiency
- 192 volume flow in L/h
- 194 providing at least one drug product filling device configured for filling at least one liquid drug product into containers
- 196 providing at least one drug product preparation device being configured for preparing the liquid drug product
- 198 providing at least one filling station for filling the liquid drug product into containers, the filling station being fluidically coupled to the drug product preparation device
- 200 providing at least one degassing device being fluidically interposed in between the drug product preparation device and the filling station and the degassing device comprising at least one membrane for separating off at least one gas from the liquid drug product
- 202 conducting the drug product from the drug product preparation device to the filling station, wherein the drug product is at least partially degassed upon passing through the degassing device
- 204 filling the at least partially degassed drug product into the containers by means of the filling station
- 205 preparing the at least one liquid drug product
- 206 degassing the liquid drug product by at least partially separating off at least one gas from the liquid drug product by using a degassing device, the degassing device comprising at least one membrane
- 207 filling the degassed liquid drug product into the container
- 208 preparing the at least one liquid drug product, the liquid drug product comprising at least one oxygen-sensitive active pharmaceutical ingredient
- 210 degassing the liquid drug product by at least partially separating off at least one gas from the liquid drug product by using a degassing device, the degassing device comprising at least one membrane.
- 212 filling the degassed liquid drug product into at least one container
- 214 preparing the at least one liquid drug product, the liquid drug product comprising at least one oxygen-sensitive active pharmaceutical ingredient and at least one polysorbate
- 216 degassing the liquid drug product by at least partially separating off at least one gas from the liquid drug product by using a degassing device, the degassing device comprising at least one membrane
- 218 filling the degassed liquid drug product into at least one container

What is claimed is:

1. A drug product filling device for filling a liquid drug product into containers, comprising:
    a) a drug product preparer configured for preparing the liquid drug product;
    b) a filling station configured for filling the liquid drug product into the containers, the filling station being fluidly coupled to the drug product preparer;
    c) a degasser fluidly interposed between the drug product preparer and the filling station, the degasser comprising a degasser membrane configured for at least partially separating off at least one gas from the liquid drug product, wherein the degasser comprises at least one hollow fiber membrane module including a plurality of hollow fibers having a first side and an opposing second side, the first side defining an interior lumen receiving the liquid drug product, wherein the hollow fibers of the at least one hollow fiber membrane module are at least partially formed by the degasser membrane and are sterilizable, wherein the hollow fibers form fiber bundles having opposing ends embedded in opposed sealings; and d) at least one in-line filtering device fluidically interposed between the drug product preparer and the filling station, wherein the in-line filtering device comprises a sterile filter.

2. The drug product filling device according to claim 1, wherein the degasser is configured for applying a pressure difference over the degasser membrane, with the liquid drug product being in contact with the degasser membrane on the first side and with the opposing second side of the degasser membrane being exposed to a lower pressure than the first side.

3. The drug product filling device according to claim 2, wherein the degasser comprises at least one of a vacuum source or a vacuum port configured for applying a vacuum to the second side.

4. The drug product filling device according to claim 1, wherein the opposing ends of the fiber bundles are connected to connection ports.

5. The drug product filling device according to claim 1, wherein the hollow fiber membrane module comprises a housing having the hollow fibers disposed therein.

6. The drug product filling device according to claim 5, wherein the hollow fiber membrane module comprises a fiber entry port connected to a first end of the hollow fibers, a fiber exit port connected to a second end of the hollow fibers, and a housing entry port and a housing exit port, both the housing entry port and the housing exit port being connected to an inner space inside the housing between the hollow fibers and a wall of the housing.

7. The drug product filling device according to claim 6, wherein the hollow fiber membrane module is fluidly interposed between the drug product preparer and the filling station in a manner selected from the group consisting of the following options:
   i) the fiber entry port is fluidly connected to the drug product preparer, and the fiber exit port is fluidly connected to the filling station;
   ii) the housing entry port is fluidly connected to the drug product preparer, and the housing exit port is fluidly connected to the filling station.

8. The drug product filling device according to claim 7, comprising option i), wherein one or both of the housing entry port and the housing exit port are connected to a suction device.

9. The drug product filling device according to claim 7, comprising option ii), wherein one or both of the fiber entry port and the fiber exit port are connected to a suction device.

10. The drug product filling device according to claim 1, wherein the degasser has at least one entry port connected to the drug product preparer and at least one exit port connected to the filling station.

11. The drug product filling device according to claim 1, wherein the filling station further comprises at least one inspection device for optically inspecting the containers after filling with the liquid drug product.

12. A method of filling at least one liquid drug product into containers, comprising:
   A) providing at least one drug product filling device configured for filling at least one liquid drug product into containers, wherein step A) further comprises:
      i) providing a drug product preparer configured for preparing the liquid drug product;
      ii) providing a filling station configured for filling the liquid drug product into the containers, the filling station being fluidically coupled to the drug product preparer;
      iii) providing a degasser fluidly interposed between the drug product preparer and the filling station and the degasser comprising at least one degasser membrane for separating off at least one gas from the liquid drug product, wherein the degasser comprises at least one hollow fiber membrane module including a plurality of hollow fibers at least partially formed by the degasser membrane, the plurality of hollow fibers having a first side and an opposing second side, the first side defining an interior lumen receiving the liquid drug product, wherein the hollow fibers are at least partially formed by the degasser membrane and are sterilizable, wherein the hollow fibers form fiber bundles having opposing ends embedded in opposed sealings;
      iv) providing at least one in-line filtering device fluidically interposed between the drug product preparer and the filling station, wherein the in-line filtering device comprises a sterile filter;
   B) conducting the liquid drug product from the drug product preparer to the filling station, wherein the liquid drug product is at least partially degassed upon passing through the degasser; and
   C) filling the at least partially degassed liquid drug product into the containers using the filling station.

13. The method of claim 12, wherein the filling station further comprises at least one inspection device for optically inspecting the containers after filling with the liquid drug product.

14. The method of claim 12, wherein the degasser is configured for applying a pressure difference over the degasser membrane, with the liquid drug product being in contact with the degasser membrane on the first side and with the opposing second side of the membrane being exposed to a lower pressure than the first side.

15. A method of increasing the accuracy of the filling weight of a liquid drug product in a container, the method comprising:
   I. preparing the liquid drug product via a drug product preparer;
   II. degassing the liquid drug product by at least partially separating off at least one gas from the liquid drug product by using a degasser, the degasser comprising at least one degasser membrane, wherein the degasser comprises at least one hollow fiber membrane module including a plurality of hollow fibers at least partially formed by the degasser membrane, the plurality of hollow fibers having a first side and an opposing second side, the first side defining an interior lumen receiving the liquid drug product, wherein the hollow fibers are at least partially formed by the degasser membrane and are sterilizable, wherein the hollow fibers form fiber bundles having opposing ends embedded in opposed sealings;
   III. providing at least one in-line filtering device fluidically interposed between the drug product preparer and a filling station, wherein the in-line filtering device comprises a sterile filter;
   IV. filling the degassed liquid drug product into the container via the filling station.

16. The method of claim 15, wherein the filling station further comprises at least one inspection device for optically inspecting the containers after filling with the liquid drug product.

17. The method of claim 15, wherein the degasser is configured for applying a pressure difference over the degasser membrane, with the liquid drug product being in contact with the degasser membrane on the first side and with the opposing second side of the degasser membrane being exposed to a lower pressure than the first side.

* * * * *